(12) United States Patent
Marple et al.

(10) Patent No.: US 11,867,948 B2
(45) Date of Patent: *Jan. 9, 2024

(54) FIBER OPTIC PROBE HAVING COMPONENTS AND FEATURES THAT IMPROVE PERFORMANCE

(71) Applicants: Eric Todd Marple, Loxahatchee, FL (US); Kirk David Urmey, West Milton, OH (US); John Meckert, Houston, TX (US)

(72) Inventors: Eric Todd Marple, Loxahatchee, FL (US); Kirk David Urmey, West Milton, OH (US); John Meckert, Houston, TX (US)

(73) Assignee: Captain JRT LLC, Loxahatchee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,688

(22) Filed: Jul. 14, 2021

(65) Prior Publication Data

US 2022/0019028 A1 Jan. 20, 2022

Related U.S. Application Data

(60) Provisional application No. 63/179,418, filed on Apr. 25, 2021, provisional application No. 63/152,937, filed on Feb. 24, 2021, provisional application No. 63/051,833, filed on Jul. 14, 2020.

(51) Int. Cl.
*G01J 3/44* (2006.01)
*G02B 6/36* (2006.01)
*G02B 6/293* (2006.01)

(52) U.S. Cl.
CPC ............ *G02B 6/29368* (2013.01); *G01J 3/44* (2013.01); *G02B 6/3624* (2013.01)

(58) Field of Classification Search
CPC .......... G01J 3/0218; G01J 3/44; G02B 6/3624
See application file for complete search history.

(56) References Cited

U.S. PATENT DOCUMENTS

| | | | | |
|---|---|---|---|---|
| 8,432,542 B2* | 4/2013 | Marple | ..................... | G02B 6/32 356/417 |
| 11,460,640 B2* | 10/2022 | Marple | ................... | G01N 21/65 |
| 2011/0135244 A1* | 6/2011 | Marple | ..................... | G01J 3/44 385/12 |
| 2017/0224220 A1* | 8/2017 | Tunnell | ..................... | G01J 3/02 |

* cited by examiner

*Primary Examiner* — Omar R Rojas
(74) *Attorney, Agent, or Firm* — Ingram IP Law, P.A.

(57) ABSTRACT

A fiber optic probe is provided with a distal sampling end, a proximal end, and light delivery and collection paths therethrough. The probe includes a window disposed at the distal sampling end of the fiber optic probe, the window having a distal end and a proximal end. A lens is disposed at the proximal end of the window, the lens having a distal end, a proximal end, and an aperture. A light delivery optical fiber is provided having a distal end and a proximal end, the distal end being received by the lens aperture. An optical isolator provided within the lens aperture to optically isolate the light delivery path and the light collection path. A collection optical fiber is provided in optical communication with the fiber collection filter. The probe may include a lens collection filter disposed between the window and the lens.

9 Claims, 14 Drawing Sheets

FIBER OPTIC PROBE HAVING COMPONENTS AND FEATURES THAT IMPROVE PERFORMANCE

CROSS-REFERENCE TO RELATED APPLICATIONS

This application claims priority to U.S. Provisional Application Ser. No. 63/051,833 filed on Jul. 14, 2020, U.S. Provisional Application Ser. No. 63/152,937 filed on Feb. 24, 2021, and U.S. Provisional Application Ser. No. 63/179,418 filed on Apr. 25, 2021, the complete disclosures of which are incorporated herein by reference in their entirety.

FIELD OF THE TECHNOLOGY

The technology relates to multi-fiber optical probes, more particularly to multi-fiber optical probes having components and features that improve performance, and still more particularly to multi-fiber optical probes having component apertures and filters in the probe tip that improve a signal-to-noise ratio.

BACKGROUND OF THE TECHNOLOGY

Light-scattering spectroscopy entails illuminating a substance and analyzing collected light rays that scatter back from the substance. Conventional fiber optic probes illuminate a substance and then guide collected light rays into a spectrometer. Known fiber optic probes include an optical fiber with a first or proximal end connected to a laser source and a second or distal end that terminates at a probe tip. The optical fiber guides light rays emitted from a laser source to the probe tip to illuminate the substance being examined. The fiber optic probe includes a separate set of optical fibers with first or distal ends located proximate to the probe tip and second or proximal ends coupled proximate to the spectrometer. The probe collects light rays scattered from the substance. The separate set of optical fibers guides the collected light rays from the probe tip to a spectrometer for analysis.

DETAILED DESCRIPTION OF THE TECHNOLOGY

Figure 1:
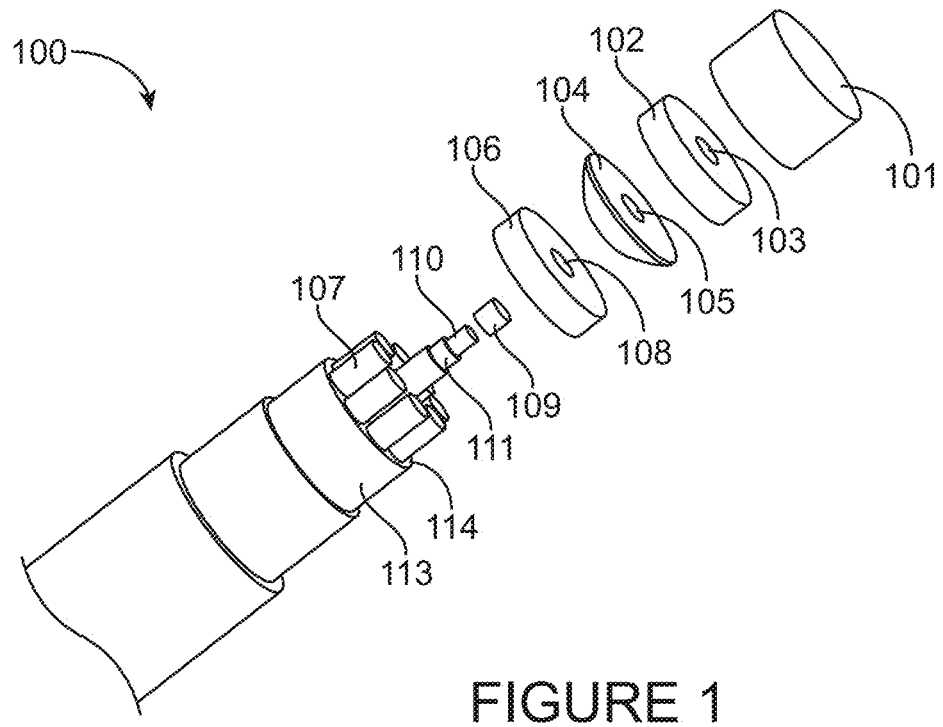
FIG. 1 illustrates an exploded view of a fiber optic probe having a filter forward of the lens, probe components with apertures, and an optical isolator according to one example of the technology.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure. The terms "comprising," "including," and "having" mean to include, but are not necessarily limited to the things so described.

The terms "connected" and "coupled" can be such that the objects are permanently connected, releasably connected, or linked. The term "substantially" is defined to be essentially conforming to the thing that it "substantially" modifies, such that the thing need not be exact. For example, substantially 2 inches (2") means that the dimension may include a slight variation.

What is needed is a fiber optic probe having an improved probe tip construction or improved probe tip components designed for spectroscopy applications, including Raman spectroscopy applications. According to one example, an improved probe tip construction includes a novel and non-obvious design or arrangement of probe tip components. For example, a lens filter component may be positioned forward of a lens component having refractive or reflective surfaces. Throughout this disclosure, forward of a component in the context of a fiber optic probe means closer to a distal end of the fiber optic probe.

According to one example, the fiber optic probe may include a probe tip construction that optically isolates the excitation laser light from probe components associated with the collection path. For example, the excitation laser light may be optically isolated and may exit the probe tip at or forward of the lens refractive or reflective surfaces associated with the collection path. According to one example, the excitation laser light may be optically isolated by blocking light penetration into substrates located adjacent to the emission waveguide or emission fiber. According to one example, one or more emission fibers may be inserted into or through apertures formed in probe tip components. According to one example, the apertures may form an optical isolator between the excitation light path and the collection light path. According to one example, the emission or light delivery fibers may be optically isolated by placing a light blocking structure such as a physical barrier, a metal tube, or the like, within apertures formed in probe tip components. Alternatively, or additionally, the emission or light delivery fibers may be optically isolated from the collection path by lining the apertures with a light blocking coating such as a black polymer, a black filled epoxy, or the like.

According to one example, the excitation laser light may be optically isolated from a lens component by forming an aperture or orifice in the lens that receives the emission fiber therethrough. In other words, the emission fiber may be inserted into or through the lens aperture. According to one example, the aperture may be lined with a light blocking coating that prevents the laser light from penetrating through the aperture sidewall. For example, the light blocking coating may be provided along a circumference of the aperture. Alternatively, the excitation laser light may be optically isolated from a lens component by placing a light blocking structure into the aperture that receives the emission fiber therethrough. The technology supports various light barriers that block, prevent, or optically isolate laser light from interacting with surrounding materials.

According to one example, the fiber optic probe may include a lens with one or more surfaces or facets that provide flat faces on working portions of the lens. In contrast, conventional lens structures generally include smooth or continuous spherical or hemispherical surfaces on working portions of the lens. According to one example, the one or more lens facets may cause light rays impinging upon the working portion of the lens to refract or totally internally reflect. According to another example, the technology may include a lens component that combines flat facets and standard or conventional smooth or continuous spherical or hemispherical surfaces. According to one example, the facets may be oriented and positioned relative to the optical fibers to appropriately guide the excitation light rays or the collection light rays. For example, the facets may guide the excitation light rays to impinge the sample or substance being examined. Furthermore, the facets may guide collection light rays that are scattered, reflected, or emitted from the sample or substance into a spectrometer. According to one example, the lens component may include multiple lens components or multiple lens elements having air gaps. Alternatively, the lens component may include a single lens component with one or more facets.

According to one example, the technology provides fiber optic probes having several optical fibers and an improved lens structure that offers a high numerical aperture. In optics, a numerical aperture is a dimensionless number that characterizes a range of angles over which a device can emit or receive light. The technology provides fiber optic probes with lens components having one or more facets that offer maximum photon collection needed for Raman spectroscopic medical applications.

According to one example, the fiber optic probe may include collection fibers arranged in a multi-ring configuration that surround the emission or light delivery fibers. According to one example, the multi-ring configuration may enable data collection from different depths relative to a sample surface. According to one example, the collection fibers associated with a ring located closer to the emission fiber may collect data from an area deeper in a sample. In contrast, collection fibers associated with a ring located farther from the emission fiber may collect data from an area closer to a sample surface. According to one example, the fiber optic probe may include a lens that directs light rays collected from different depths within a sample to one or more of the several collection fiber rings.

According to one example, a computer system coupled to a spectrometer may capture and analyze spectral data associated with the fiber optic probe. According to one example, the computer system may separately analyze spectral data associated with the one or more optical fiber rings. Accordingly, the computer system may analyze spectral data separately for optical fiber rings associated with different depth measurements. According to one example, the computer system may manipulate the spectral data using mathematical operations. For example, the computer system may add, subtract, multiply, or perform other mathematical operations on the spectral data associated with different optical rings.

According to one example, the fiber optic probe may include a calibration fiber that internally originates a calibration signal. According to one example, generating an internal calibration signal may simplify, expedite, and eliminate drawbacks typically associated with obtaining an external calibration signal. According to one example, the internal calibration signal may be employed in medical settings that require a sterilized calibration source or sample. According to one example, a calibration fiber may include a sealed or sterilized calibration sample at the probe tip.

Applications for the technology may include optical scanners and probes used during medical operations to provide essential molecular information, optical scanners and probes used to obtain pathology information, optical scanners and probes used to provide surgical guidance or additional information associated with tissue removal, and diagnostic applications, among other applications. The technology offers improved performance and reduced acquisition time during real-time medical procedures or surgeries, when acquisition time is of the essence.

According to one example, the optical technology described herein may be used in conjunction with other imaging technology such as magnetic resonance imaging (MRI) technology or the like. An MM scan is a medical imaging technique that uses a magnetic field and computer-generated radio waves to create detailed images of organs and body tissue. According to one example, MRI scans generate soft tissue contrast that is used to detect a cancer tumor or other abnormal tissue. However, MM technology has limited resolution meaning it may not be able to detect abnormal tissue occurring in low density. In contrast, the optical technology described herein is capable of detecting the presence of a single atom or molecule of a substance. Cancer cells are physically different from healthy cells. Thus, the optical technology described herein is capable of discovering a single cancer cell within an otherwise healthy organ.

According to one example, the optical technology described herein may be used with other imaging systems to enhance overall system performance. For example, images associated with chemical data generated by the optical technology described herein may be overlayed on images associated with electro-magnetic data generated by an MM system data to enhance overall system performance. According to one example, known MM technology may generate a three-dimensional (3-D) image of the human brain with position data. The optical technology described herein may generate chemical data obtained from known depths relative to a known reference point within the human brain. According to one example, the enhanced system may detect and calculate a location in 3-D space of a cancer cell by overlaying the chemical data associated with a known depth and the 3-D location data associated with the electro-magnetic data.

FIG. 1 illustrates an exploded view of a probe tip for a fiber optic probe 100 having a lens filter, probe components with apertures, and an optical isolator according to one example of the technology. According to one example, the fiber optic probe 100 may include several components such as a window 101, a lens filter 102 having an aperture 103, a lens 104 with an aperture 105, a collection fiber filter 106 associated with one or more rings of collection fibers 107, the collection fiber filter 106 having an aperture 108, an emission fiber filter 109 associated with one or more emission fibers 110, and a needle tube 111 that prevents light transfer proximate to the probe tip between the emission fibers 110 and the collection fibers 107. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path. According to one example, a carbon black filled epoxy may be used in place of the needle tube 111. According to one example, the component apertures, the needle tube 111, the carbon black filled epoxy, and the like, are referred to as optical isolators herein since they may optically isolate the light delivery path and the light collection path. According to one example, the lens filter 102, the lens 104, and the collection fiber filter 106 may be annular or donut-shaped components. According to one example, the emission fiber filter 109 and the emission fiber 110 may be inserted into or may pass through corresponding apertures in the donut-shaped components when the fiber optic probe 100 is assembled. According to one example, the filter components may include dielectric filter components with the filter material deposited on a substrate. According to one example, an anti-reflective (AR) coating may be applied to probe components such as the lens to minimize reflective losses.

Figure 6B:
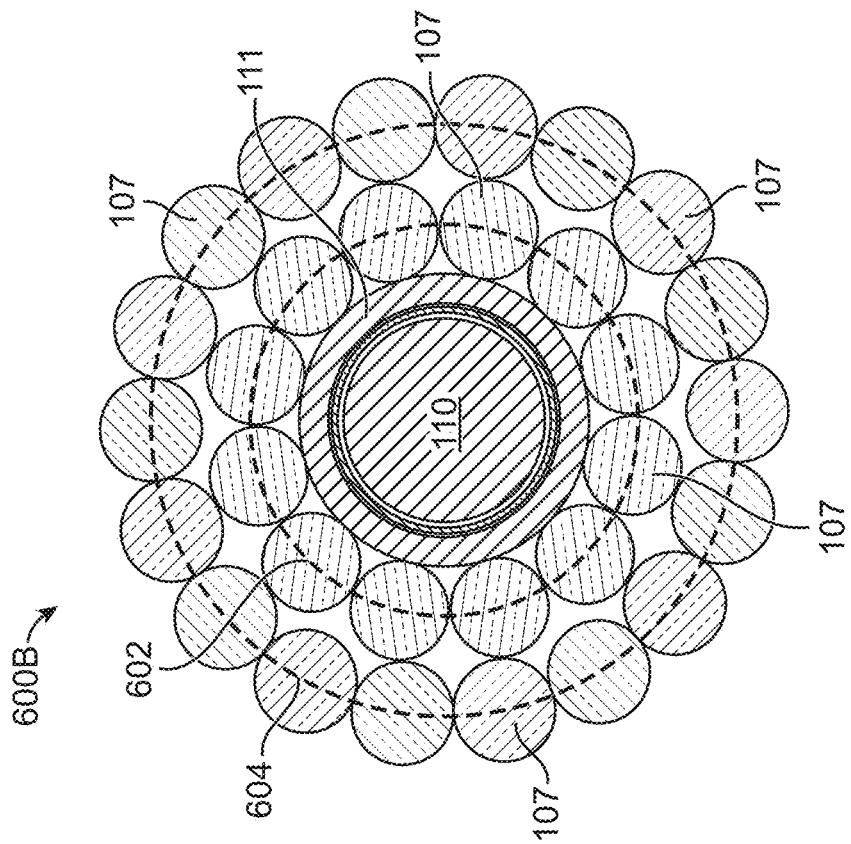
FIG. 6B illustrates an end view of an optical fiber having a multi-ring concentric configuration of collection fibers according to one example of the technology.
Figure 6A:
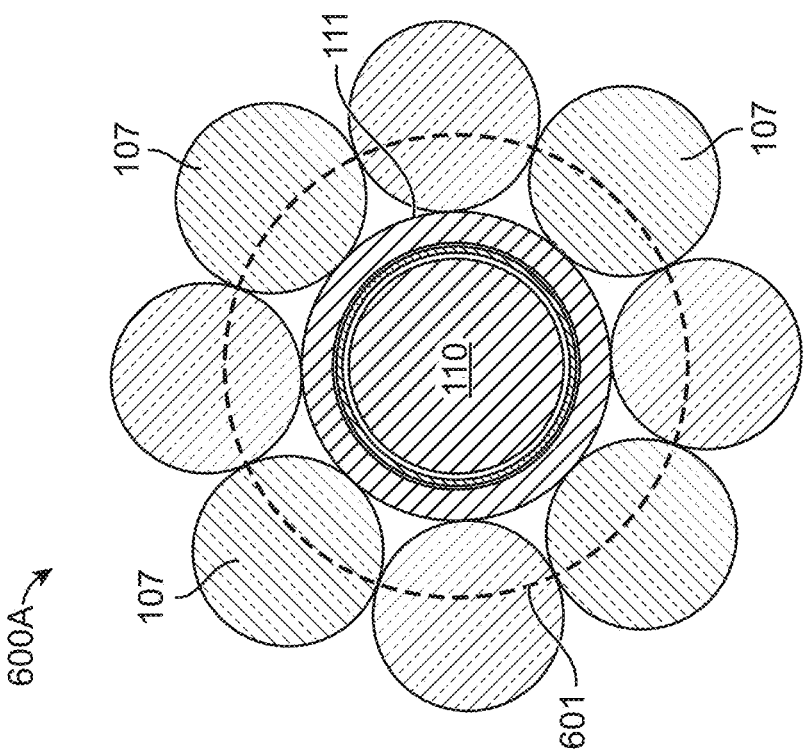
FIG. 6A illustrates an end view of an optical fiber having a single ring configuration of collection fibers according to one example of the technology.

According to one example, the fiber optic probe 100 may include a fiber alignment holder 113 that defines a fiber pattern on an end face 114. For example, FIG. 1 illustrates a centrally positioned emission fiber 110 surrounded by a circular or revolver pattern of collection fibers 107. FIG. 6A illustrates a top view of this concentric single ring 701 configuration. According to one example, the apertures 103, 105, 108 defined in the fiber optic components may be formed to substantially align with the position of the emission fiber 110 in the fiber alignment holder 113.

According to one example, the fiber alignment holder 113 with the end face 114 may be employed to secure the collection fibers 107 and the emission fibers 110 in a desired configuration. According to one example, the end face 114 may include one or more apertures adapted to secure the collection fibers 107 and the emission fibers 110 in a desired configuration. According to one example, the end face 114 may include a plurality of apertures that receive the collection fibers 107 therethrough. According to one example, the end face 114 may include a large central aperture that receives the emission fibers 110 therein. According to one example, the apertures may be patterned to secure the optical fibers in any desired arrangement or configuration such as a ring-shaped arrangement, a linear arrangement, or the like. According to one example, the apertures may be arranged in a random or specific formation such as a single ring pattern, a multi-ring pattern, a single line pattern, multi-line pattern, or the like. According to one example, the apertures may be provided in any combination of an individual fiber pattern or a group pattern such as a ring pattern, a line pattern, or the like.

According to one example, a shape of the probe components such as the lens, the facets, the filters, or the like, may dictate or determine the aperture requirements and the optical fiber arrangement. According to one example, the collection and emission fibers 107,110 may be inserted into corresponding apertures in the end face 114 and may be secured in place to render a desired optical fiber arrangement. For example, the collection and emission fibers 107, 110 may be secured by a friction fit, an epoxy, or the like. According to one example, the collection and emission fibers 107,110 may be inserted individually into corresponding apertures of the end face 114. Additionally, or alternatively, the collection and emission fibers 107,110 may be bundled or grouped together for insertion into corresponding apertures of the end face 114. For example, FIG. 1 illustrates a group of emission fibers 110 that are bundled together in a single aperture provided in the end face 114. Furthermore, FIG. 1 illustrates collection fibers 107 inserted individually into multiple apertures provided in the end face 114. In this way, the fiber alignment holder 113 and the end face 114 may be formed to align or match a pattern of the collection and emission fibers 107,110 with a geometry of the lens or facets.

According to one example, the collection and emission fibers 107,110 may be inserted into or may pass through corresponding apertures in the end face 114 and may be positioned relative to other components of the fiber optic probe 100 as desired. For example, the collection and emission fibers 107,110 may be inserted into or may pass through corresponding apertures in the end face 114 and may be positioned to abut against the lens 104 or the filters 106,109. According to another example, the collection and emission fibers 107,110 may be inserted through the corresponding apertures in the end face 114 and may be offset a desired distance from the lens structure 104 or the filters 106,109. According to one example, the collection and emission fibers 107,110 may be fixedly secured to the end face 114, to the lens 104, or the filters 106,109 such as by epoxy or the like. Any epoxy applied to light transmission interfaces should be a clear optical epoxy to allow efficient passage of light rays. According to one example, the collection fibers 107 may be secured by epoxy and polished. For example, the collection fibers 107 may be polished together. According to one example, the emission fibers 110 may be polished separately from the collection fibers 107. According to one example, an assembly that includes the emission fibers 110 may be inserted through the corresponding aperture in end face 114. According to one example, the collection fibers 107 initially may be secured to corresponding apertures of the end face 114 and subsequently the emission fibers 110 may be secured to an aperture of the end face 114. Next, the collection fiber filter 106 may be attached, followed by the lens 104 or the window 101. According to one example, the fiber alignment holder 113 and the end face 114 may be formed using various techniques. For example, the fiber alignment holder 113 and the end face 114 may be formed by machining, 3D printing, molding, or the like. According to one example, the end face 114 may include apertures having different shapes such as slots. According to one example, the slots may be dimensioned such that a width of the slot is substantially equivalent to a diameter of an optical fiber. According to one example, the slots may be configured to receive multiple optical fibers in order to form multi-fiber configurations such as radial lines, curved lines, geometrical shapes, or the like.

According to one example, the lens filter 102 may include a long-pass or a notch filter. According to one example, the lens filter 102 may be a donut-shaped long-pass or notch filter. The lens filter 102 is designed to decrease a light intensity before the collected light rays interact with the lens material or other probe materials. Accordingly, the lens filter 102 allows the optic probe 100 to minimize noise signal generation while employing virtually any lens or substrate material. Without inclusion of the lens filter 102, the collected light rays may create noise signals such as unwanted peaks, interference, or background fluorescence when impinging the probe components. For example, the collected light rays may cause probe components to fluoresce when impinged. The noise signals, including unwanted peaks, interference, or background fluorescence, may be added to or superimposed over spectra of a desired specimen.

According to one example, this new probe design includes a lens filter 102 positioned forward or upstream of the lens 104 that decreases or flattens background interference or noise signals attributed to collected light rays impinging on the lens 104. According to one example, minimizing background interference or noise signals attributed to the lens 104 may increase a signal-to-noise ratio (SNR) for a system. Still further, placing the lens filter 102 forward or upstream of other probe components may decrease or flatten background interference or noise signals attributed to collected light rays that impinge downstream probe components. According to one example, minimizing background interference or noise signals attributed to one or more probe components increases a SNR of the system.

According to another example, providing optical isolators between the light delivery path and the light collection path such as an aperture 103 in the lens 102 and apertures 105,108 in the other probe components may substantially eliminate noise signals such as unwanted peaks, interference, or background fluorescence caused by the excitation laser impinging upon these components. Accordingly, providing apertures 103,105,108 in the various probe components increases a SNR of the system and minimizes negative influences or crosstalk attributed to the excitation laser. In this way, the SNR of the system may be increased based upon a combination of providing one or more apertures 103,105,108 in the probe components and providing the lens filter 102 forward of the lens 104 or other probe components. One of ordinary skill in the art will readily appreciate that the one or more filters may be eliminated from the fiber optic probe 100 depending on the spectroscopic application.

While the component apertures 103,105,108 improve a SNR of the system, the air gap formed between a circumference of the emission fiber 110 and a circumference of the component apertures 103,105,108 may introduce unfavorable characteristics to the probe tip such as reduced rigidity or crosstalk originating from the emission fibers 110 to the collection fibers 107. According to one example, crosstalk may occur when emission light rays disperse or leak at material interfaces. A remedy includes filling the air gap, which forms an optical isolator between the light delivery path and the light collection path. For example, the air gap may be filled with a material such as a waveguide or non-waveguide material. According to one example, a carbon black filled epoxy may be applied to a perimeter of the one or more apertures 103,105,108 as an additional optical isolator between the light delivery path and the light collection path. According to one example, a cylindrical-shaped core material such as fused silica or magnesium fluoride may be inserted into the air gap as yet another optical isolator between the light delivery path and the light collection path and to increase probe tip rigidity. According to one example, the carbon black filled epoxy may be applied to a perimeter of the one or more apertures 103,105,108 and the cylindrical-shaped core material may be inserted into the air gap to provide multiple optical isolators between the light delivery path and the light collection path. For example, the cylindrical-shaped core material or tube may be friction fitted or bonded to an inside perimeter of the one or more apertures 103,105,108.

According to one example, the carbon black lined apertures provide optical isolation by absorbing stray light, while the cylindrical-shaped core material adds rigidity and additional optical isolation. According to one example, the carbon black lined apertures prevent the excitation laser light from entering the light collection path. Stated differently, the carbon black lined apertures block the excitation laser light from penetrating into adjacent materials. Furthermore, the carbon black lined apertures block the collected light from penetrating into the emission fiber 110 or light delivery path. Accordingly, the technology provides minimal crosstalk between the excitation laser light and the collected light rays, which results in an improved SNR for the collected light signals. One of ordinary skill in the art will readily appreciate that other techniques may be employed to fill the air gap formed between the circumference of the emission fiber 110 and the circumference of the component apertures 103,105,108.

According to one example, the fiber optic probe 100 may include the window 101 as an outer component of the probe tip that may directly contact a substance during testing. According to one example, a thickness of the window 101 may be selected so that the distal end is positioned at or proximate to a maximum intensity area defined by an intersection of the emission light rays and the collection light rays. According to one example, the fiber optic probe 100 may be maintained a certain distance from the specimen or substance during use. According to one example, the window 101 may be constructed of one or more materials such as magnesium fluoride ($MgF_2$), fused silica, sapphire, or the like, that are transparent to light rays over a wide range of wavelengths and avoid generating spectral interference or noise signals. According to one example, the window 101 may be employed to protect the probe components. According to one example, the window 101 may be employed during Raman or other spectroscopic techniques to generate a reference peak or spectra during calibration.

According to one example, the window 101 may be formed by depositing or adhering a thin layer of material such as diamond, sapphire, or the like on either side of the window 101. For example, the thin layer of material may be adhered on either side of the window 101 using epoxy or the like. According to another example, the thin layer of material may be sandwiched between two window pieces to protect the calibration layer. According to one example, the reference peak or spectra may be used to calibrate or normalize probes or full systems, including lasers, probes, spectrometers, detectors, to each other. According to one example, the material and window or layer thickness may be selected to enhance durability, minimize spectral interference, enhance light intensity at the sample, and improve calibration. According to one example, the material and window or layer thickness may be selected to enhance spectral signal acquisition for materials or samples being investigated. According to one example, a magnesium fluoride window may be used alone or in a layer to improve calibration for Raman spectroscopy. One of ordinary skill in the art will readily appreciate that the window 101 may be constructed of any materials that are substantially transparent to light over a wide range of wavelengths and avoid generating spectral interference, noise signals, or a window Raman signal that may overshadow a sample Raman signal.

Figure 2:
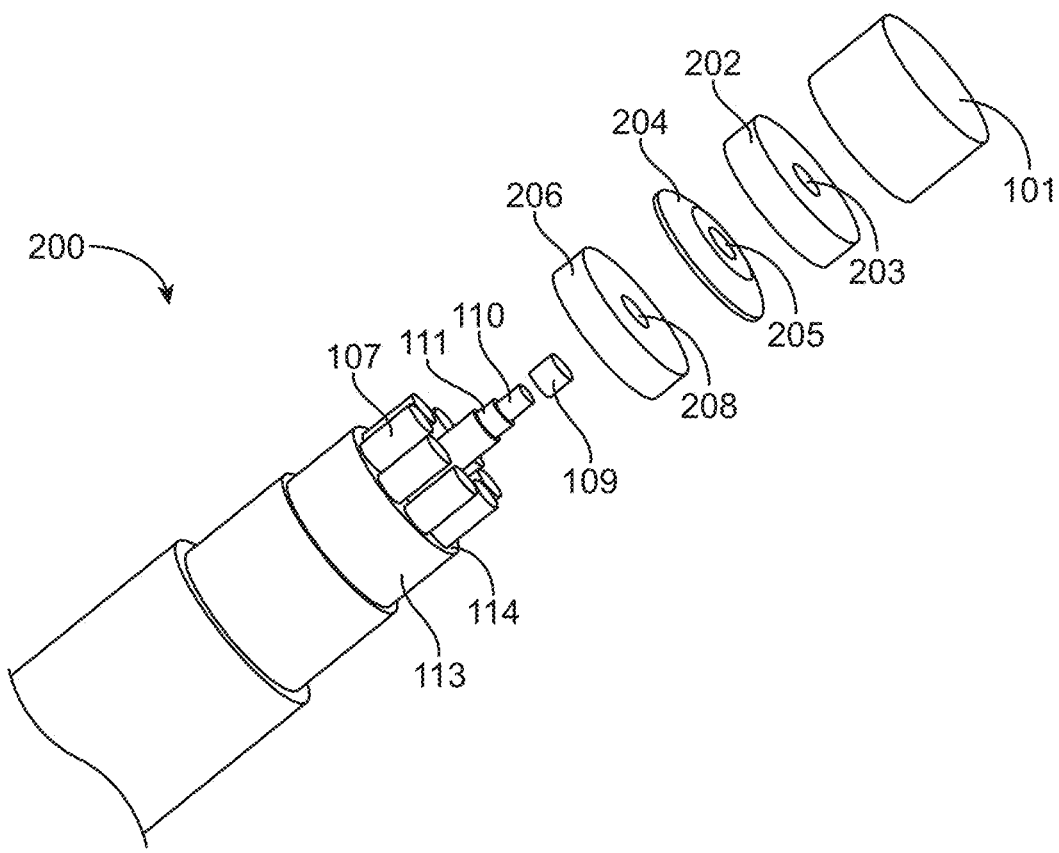
FIG. 2 illustrates an exploded view of a fiber optic probe having a filter forward of the lens, probe components with apertures, and an optical isolator according to another example of the technology.

According to one example, the fiber optic probes may be modified such as by providing different component orientations, different component arrangements, different lens styles, different component shapes, or the like. FIG. 2 illustrates an exploded view of an alternative probe tip for a fiber optic probe 200 having a lens filter, optical isolators, and probe components with apertures according to one example of the technology. Fiber optic probe 200 is similar to fiber optic probe 100 illustrated in FIG. 1, except an orientation of the lens 204 is flipped compared to the orientation of lens 104. Accordingly, an air interface is provided proximate to a proximal end of the lens filter 202 in FIG. 2. In contrast, an air interface is provided proximate to the distal end of the collection fiber filter 106 in FIG. 1. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path.

According to one example, the lens 204 includes an aperture 205 that receives one or more emissions fibers 110 therethrough. According to one example, a lens filter 202 includes an aperture 203 that receives one or more emissions fibers 110 therethrough. According to one example, the apertures 203,205 are optical isolators between the light delivery path and the light collection path. According to one example, the lens filter 202 is designed to compensate for qualities and characteristics of the lens 204, the other probe components, or the collected light. For example, the lens filter 202 may be designed to decrease a light intensity before the collected light rays impinge a lens material or other probe materials. Accordingly, the lens filter 202 allows the fiber optic probe 200 to minimize noise signal generation while employing virtually any lens or substrate material. Without inclusion of the lens filter 202, the collected light rays may create noise signals such as unwanted peaks, interference, or background fluorescence when impinging the probe components. For example, the collected light rays may cause probe components to fluoresce when impinged. The noise signals, including unwanted peaks, interference, or background fluorescence, may be added to or superimposed over spectra of a desired specimen.

According to one example, the probe design includes a lens filter 202 positioned forward or upstream of the lens 204 to decrease or flatten background interference or noise signals attributed to collected light rays impinging on the lens 204. According to one example, minimizing background interference or noise signals attributed to the lens 204 may increase a SNR for a system. Still further, placing the lens filter 202 forward or upstream of other probe components may decrease or flatten background interference or noise signals attributed to collected light rays that impinge downstream probe components. According to one example, minimizing background interference or noise signals attributed to one or more probe components increases a SNR of the system.

According to one example, the lens filter 202, the lens 204, and the collection fiber filter 206 may be donut-shaped components. According to one example, the emission fiber filter 109 and the emission fiber 110 may be inserted into or pass through the donut-shaped components when the fiber optic probe 200 is assembled. FIG. 2 illustrates a centrally positioned emission fiber 110 surrounded by a circular pattern of collection fibers 107. FIG. 6A illustrates a top view of this concentric single ring 701 configuration. According to one example, the apertures 203,205,208 defined in the fiber optic components may be formed to substantially align with the position of the emission fiber 110. According to one example, the component shapes and the component arrangements illustrated in FIG. 2 may be substantially similar to the probe components illustrated in FIG. 1. Accordingly, the component details described with respect to FIG. 1 are not repeated with respect to FIG. 2.

Figure 3:
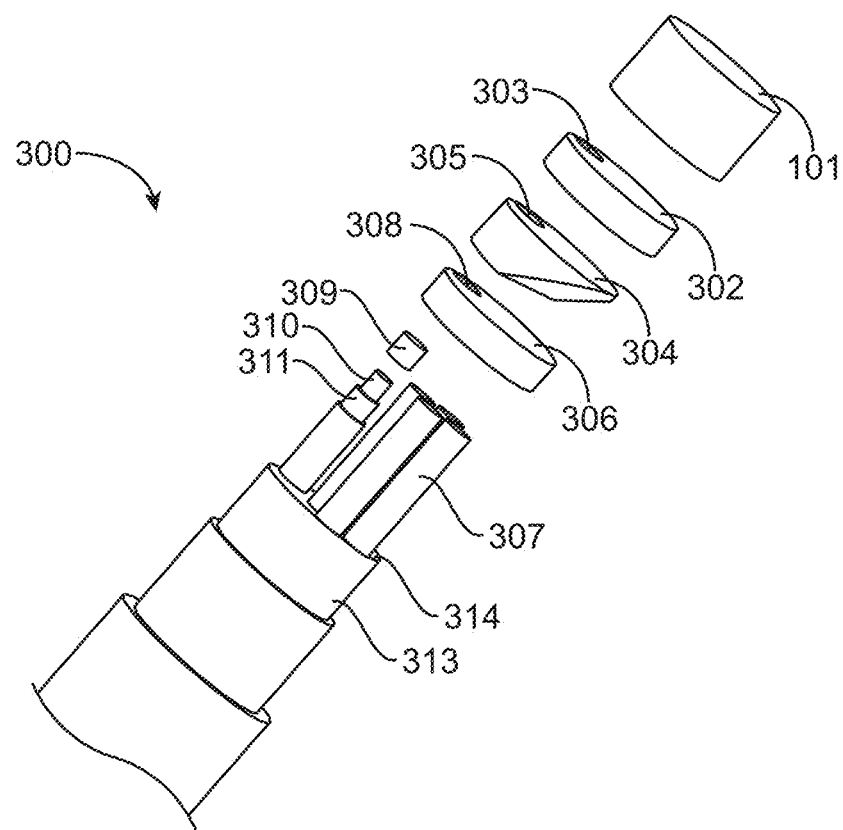
FIG. 3 illustrates an exploded view of a fiber optic probe having a filter forward of the lens, probe components with apertures, and an optical isolator according to another example of the technology.

FIG. 3 illustrates an exploded view of an alternative probe tip for a fiber optic probe 300 having a lens filter, probe components with apertures, an optical isolator, and a side-by-side arrangement of the collection fibers 307 and the emission fibers 310 according to one example of the technology. According to one example, the emission fiber 310 may be positioned at an edge of the fiber alignment holder 313. According to one example, the collection fibers 107 may be positioned throughout the remaining portion of the fiber alignment holder 313. According to one example, the probe components may include apertures or optical isolators formed to substantially align with the position of the emission fibers 310. According to one example, the fiber optic probe 300 may include several components such as a window 101, a lens filter 302 having an aperture 303, a lens 304 with an aperture 305, a collection fiber filter 306 associated with one or more rings of collection fibers 307, the collection fiber filter 306 having an aperture 308, an emission fiber filter 309 associated with one or more emission fibers 310, and a needle tube 311 that prevents light transfer proximate to the probe tip between the emission fibers 310 and the collection fibers 307. According to one example, a carbon black filled epoxy may be used in place of the needle tube 311. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path. According to one example, the component apertures, the needle tube 311, the carbon black filled epoxy, and the like, are referred to as optical isolators herein since they may optically isolate the light delivery path and the light collection path.

According to one example, the lens filter 302, the lens 304, and the collection fiber filter 306 may include apertures 303,305,308, respectively, that are formed to substantially align with a position of the emission fibers 310 in the fiber alignment holder 313. For example, the apertures 303,305, 308 may be provided along an edge of the lens filter 302, the lens 304, and the collection fiber filter 306, respectively. According to one example, the apertures 303,305,308 may be formed in non-active portions of the probe components. With reference to FIG. 3, the non-active portions may be located proximate to the emission fibers 310. Alternatively, the active portions of the probe components may be located along the collection path in optical communication with the collection fibers 307. For example, the aperture 305 may be formed in a non-active portion of the lens 304, while the active portions of the lens 304 may be positioned in optical communication with the collection fibers 307. For example, the active portions of the lens 304 may correspond to refractive or reflective surfaces. According to one example, the emission fiber filter 309 and the emission fiber 310 may be inserted into or may pass through corresponding apertures in the probe components when the fiber optic probe 100 is assembled. For example, the emission fiber 310 may be placed on a side or refractive portion of the lens 304.

According to one example, the lens filter 302 is designed to compensate for undesired qualities and characteristics of the lens 304, the other probe components, or the collected light rays. For example, the lens filter 302 may be designed to decrease a light intensity before the collected light rays interact with the lens material or other probe materials. Accordingly, the lens filter 302 allows the optic probe 300 to minimize noise signal generation while employing virtually any lens or substrate material. Without inclusion of the lens filter 302, the collected light rays may create noise signals such as unwanted peaks, interference, or background fluorescence when impinging the probe components. For example, the collected light rays may cause probe components to fluoresce when impinged. The noise signals, including unwanted peaks, interference, or background fluorescence, may be added to or superimposed over spectra of a desired specimen.

According to one example, the probe design includes a lens filter 302 positioned forward or upstream of the lens 304 to decrease or flatten background interference or noise signals attributed to collected light rays impinging on the lens 304. According to one example, minimizing background interference or noise signals attributed to the lens 304 may increase a SNR for a system. Still further, placing the lens filter 302 forward or upstream of other probe components may decrease or flatten background interference or noise signals attributed to collected light rays that impinge downstream probe components. According to one example, minimizing background interference or noise signals attributed to one or more probe components increases a SNR of the system.

With respect to FIGS. 2 and 3, while the component apertures 203,205,208/303,305,308 improve a SNR of the system, the air gap formed between a circumference of the emission fiber 110/310 and a circumference of the component apertures 203,205,208/303,305,308 may introduce unfavorable characteristics to the probe tip such as reduced rigidity or crosstalk originating from the emission fibers 110/310 to the collection fibers 107/307. According to one example, crosstalk may occur when emission light rays disperse or leak at material interfaces. A remedy includes filling the air gap, which forms an optical isolator between the light delivery path and the light collection path. For example, the air gap may be filled with a material such as a waveguide or non-waveguide material. According to one example, a carbon black filled epoxy may be applied to a perimeter of the one or more apertures 203,205,208/303, 305,308 as an additional optical isolator between the light delivery path and the light collection path. According to one example, a cylindrical-shaped core material such as silica or magnesium fluoride may be inserted into the air gap as yet another optical isolator between the light delivery path and the light collection path and to increase probe tip rigidity. According to one example, the carbon black filled epoxy may be applied to a perimeter of the one or more apertures 203,205,208/303,305,308 and the cylindrical-shaped core material may be inserted into the air gap to provide multiple optical isolators between the light delivery path and the light collection path. For example, the cylindrical-shaped core material or tube may be friction fitted or bonded to an inside perimeter of the one or more apertures 203,205,208/303, 305,308.

According to one example, the carbon black lined apertures provide optical isolation by absorbing stray light, while the cylindrical-shaped core material adds rigidity and additional optical isolation. According to one example, the carbon black lined apertures prevent the excitation laser light from entering the light collection path. Stated differently, the carbon black lined apertures block the excitation laser light from penetrating into adjacent materials. Furthermore, the carbon black lined apertures block the collected light from penetrating into the emission fiber 110/310 or light delivery path. Accordingly, the technology provides minimal crosstalk between the excitation laser light and the collected light rays, which results in an improved SNR for the collected light signals. One of ordinary skill in the art will readily appreciate that other techniques may be employed to fill the air gap formed between the circumference of the emission fiber 110/310 and the circumference of the component apertures 203,205,308/303,305,308.

Figure 4:
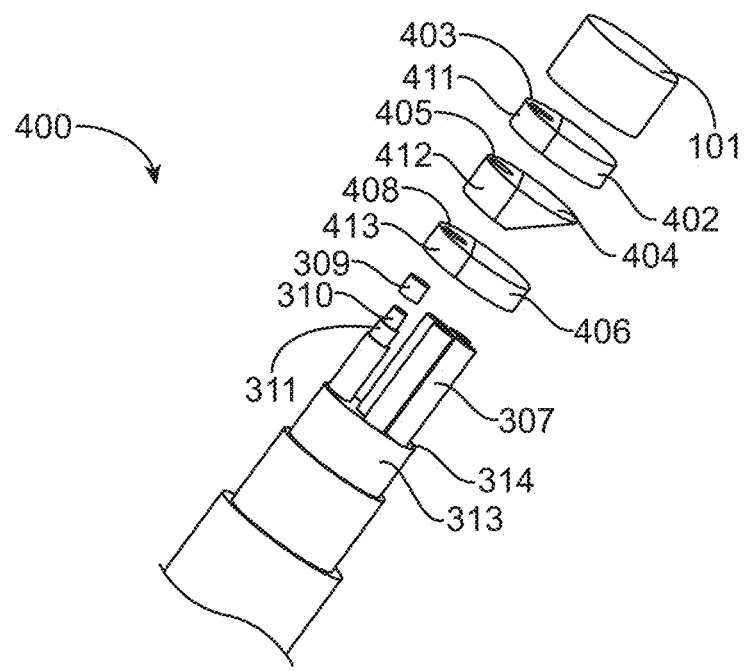
FIG. 4 illustrates an exploded view of a fiber optic probe having a filter forward of the lens and an alignment feature with apertures according to one example of the technology.

FIG. 4 illustrates an exploded view of another alternative probe tip for a fiber optic probe 400 having a lens filter, alignment feature components with apertures, and a side-by-side arrangement of the collection fibers 307 and the emission fibers 310 according to one example of the technology. According to one example, the emission fiber 310 may be positioned at an edge of the fiber alignment holder 313. According to one example, the collection fibers 307 may be positioned throughout the remaining portion of the fiber alignment holder 313. According to one example, the probe components 402,404,406 may be coupled to alignment feature components 411,412,413 having apertures 403, 405,408. In this way, the probe components themselves do not require apertures and the alignment features may include desired light blocking characteristics. According to one example, the emission fiber filter 309 and the emission fiber 310 may be inserted into or may pass through corresponding apertures in the alignment feature components 411,412,413 when the fiber optic probe 400 is assembled. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path.

According to one example, the air gap formed between a circumference of the emission fiber 310 and a circumference of the apertures 403,405,408 may introduce unfavorable characteristics to the probe tip such as reduced rigidity or crosstalk originating from the emission fibers 310 to the collection fibers 307. According to one example, crosstalk may occur when emission light rays disperse or leak at material interfaces. A remedy includes filling the air gap, which forms an optical isolator between the light delivery path and the light collection path. For example, the air gap may be filled with a material such as a waveguide or non-waveguide material. According to one example, the air gap may be filled with a gap filler such as epoxy, adhesive, or other gap filler. Furthermore, a cylindrical-shaped core material such as silica or magnesium fluoride may be inserted into the air gap. For example, the cylindrical-shaped core material or tube may be friction fitted or bonded to an inside perimeter of the one or more apertures 403,405,408.

According to one example, the probe components 402, 404,406 may be coupled to the alignment features 411,412, 413 in any of various ways. For example, the probe components may be coupled to the alignment features using chemical bonding such as epoxy, glue, or the like. Alternatively, the probe components may be coupled to the alignment features using mechanical bonding such as fasteners, tongue and groove, or the like. One of ordinary skill in the art will readily appreciate that several techniques may be employed to couple the probe components and the alignment features together.

According to one example, the fiber optic probe 400 may include several components such as a window 101, a lens filter 402, a lens filter alignment feature 411 having an aperture 403, a lens 404, a lens alignment feature 412 with an aperture 405, a collection fiber filter 406 associated with one or more rings of collection fibers 307, a collection fiber alignment feature 413 having an aperture 408, an emission fiber filter 309 associated with one or more emission fibers 310, and a needle tube 311 that prevents light transfer proximate to the probe tip between the emission fibers 310 and the collection fibers 307. According to one example, a carbon black filled epoxy may be used in place of the needle tube 311. According to one example, the probe components 402,404,406 may be constructed without apertures. According to one example, the probe components 402,404,406 may be shaped to mechanically couple to the alignment features 411,412,413 and to fit within the contours of the probe tip. According to one example, the alignment features 411,412, 413 may be configured to optically isolate the collection light path and the excitation light path. According to one example, the alignment features 411,412,413 may be constructed of a light blocking substrate such as black plastic, black epoxy, a metal tube, a physical light block, or the like.

According to an alternative example, the probe tip may define an orifice or aperture that receives emission fibers therein (not shown) such that none of the probe components, including the alignment features, require an aperture to receive the emission fibers 310. According to one example, the emission fiber 310 may pass through an orifice or aperture defined in a probe body that forms the probe tip. According to one example, the emission fiber 310 may be affixed to the probe body using epoxy, glue, or the like. Alternatively, or additionally, the collection fibers 307 may pass through an orifice or aperture defined in the probe body and may be affixed to the probe body using epoxy, glue, or the like.

According to one example, the lens filter 402 may be a long-pass or a notch-pass filter. According to one example, the lens filter 402 is designed to decrease a light intensity before the collected light rays impinge a lens material or other probe materials. Accordingly, the lens filter 402 allows the optic probe 400 to minimize noise signal generation while employing virtually any lens or substrate material. Without inclusion of the lens filter 402, the collected light rays may create noise signals such as unwanted peaks, interference, or background fluorescence when impinging the probe components. For example, the collected light rays may cause probe components to fluoresce when impinged. The noise signals, including unwanted peaks, interference, or background fluorescence, may be added to or superimposed over spectra of a desired specimen.

According to one example, the probe design includes a lens filter 402 positioned forward or upstream of the lens 404 that decreases or flattens background interference or noise signals attributed to collected light rays impinging on the lens 404. According to one example, minimizing background interference or noise signals attributed to the lens 404 may increase a SNR for the system. Still further, placing the lens filter 402 forward or upstream of other probe components may decrease or flatten background interference or noise signals attributed to collected light rays that impinge downstream probe components. According to one example, minimizing background interference or noise signals attributed to one or more probe components increases a SNR of the system.

Figure 5A:
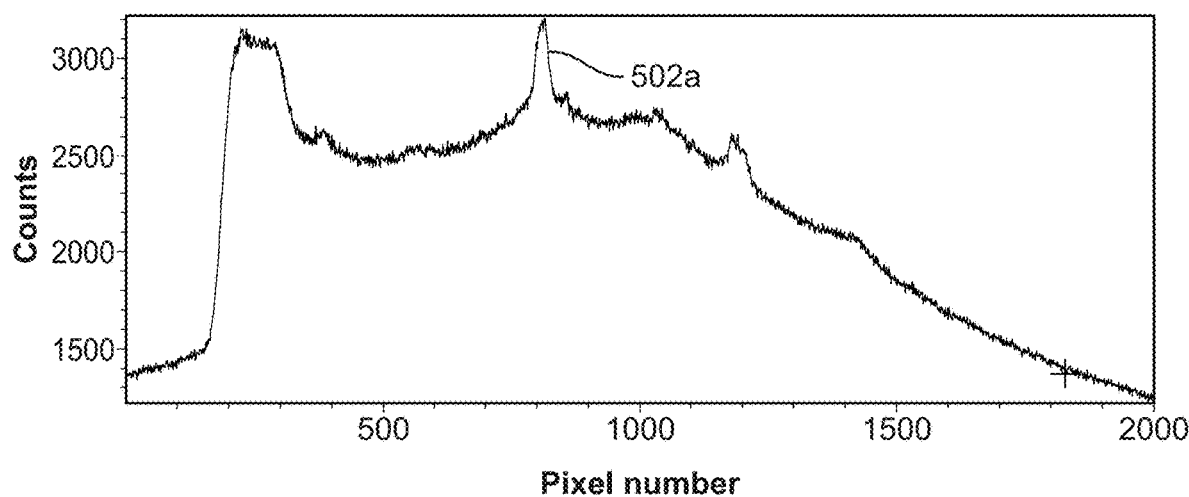
FIG. 5A illustrates a Raman spectrum for a conventional fiber optic probe according to one example of the technology.
Figure 5B:
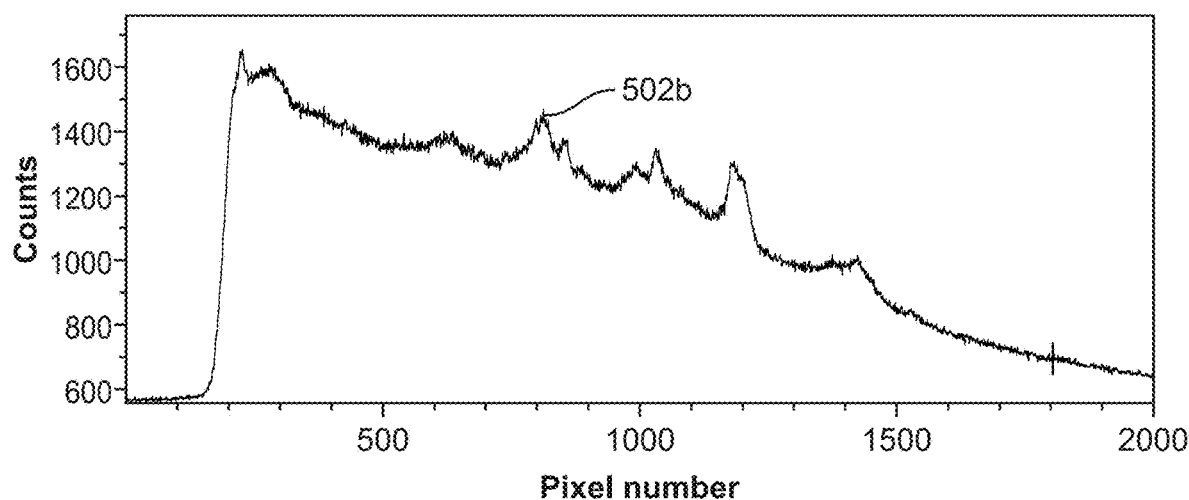
FIG. 5B illustrates a Raman spectrum for an improved fiber optic probe according to one example of the technology.

FIG. 5A illustrates Raman spectra of whole milk captured or collected using a conventional fiber optic probe without an optical isolator or a lens filter, among other features. The various peaks illustrated in the Raman spectra of FIG. 5A correspond to fluorescence and spectral signals contributed both from the whole milk sample and probe features. FIG. 5B illustrates Raman spectra of whole milk captured or collected with the improved probes described herein having probe components with apertures or optical isolators that receive the emission fibers therein. The various peaks illustrated in FIG. 5B correspond to the spectral signal for the whole milk sample, with minimal fluorescence and spectral signals contributed by probe features. According to one example, the improved and conventional probes used to capture the Raman spectra illustrated in FIGS. 5A and 5B are similarly constructed, with probe components for each probe made from a same substrate material. Furthermore, the Raman spectra illustrated in FIGS. 5A and 5B are associated with the same spectrometer, the same parameters, and the same settings such as laser power, acquisition time, or the like.

A comparison of the Raman spectra illustrated in FIGS. 5A and 5B demonstrates how an overall background noise is reduced or flattened for the improved probe design. With reference to FIG. 5A, the peak 502a positioned around pixel number 800 in the Raman spectra is generated from the probe components themselves such as the lenses and other probe components and is not attributed only to the whole milk sample. With reference to FIG. 5B, peak 502b around pixel number 800 is flattened since the noise signals attributed to the probe components of FIG. 5A are essentially eliminated with the improved probe design. A comparison of the Raman spectra illustrated in FIGS. 5A and 5B demonstrate that the peak 502a attributed to the probe components obscured an actual peak 502b of the whole milk sample.

Figure 7:
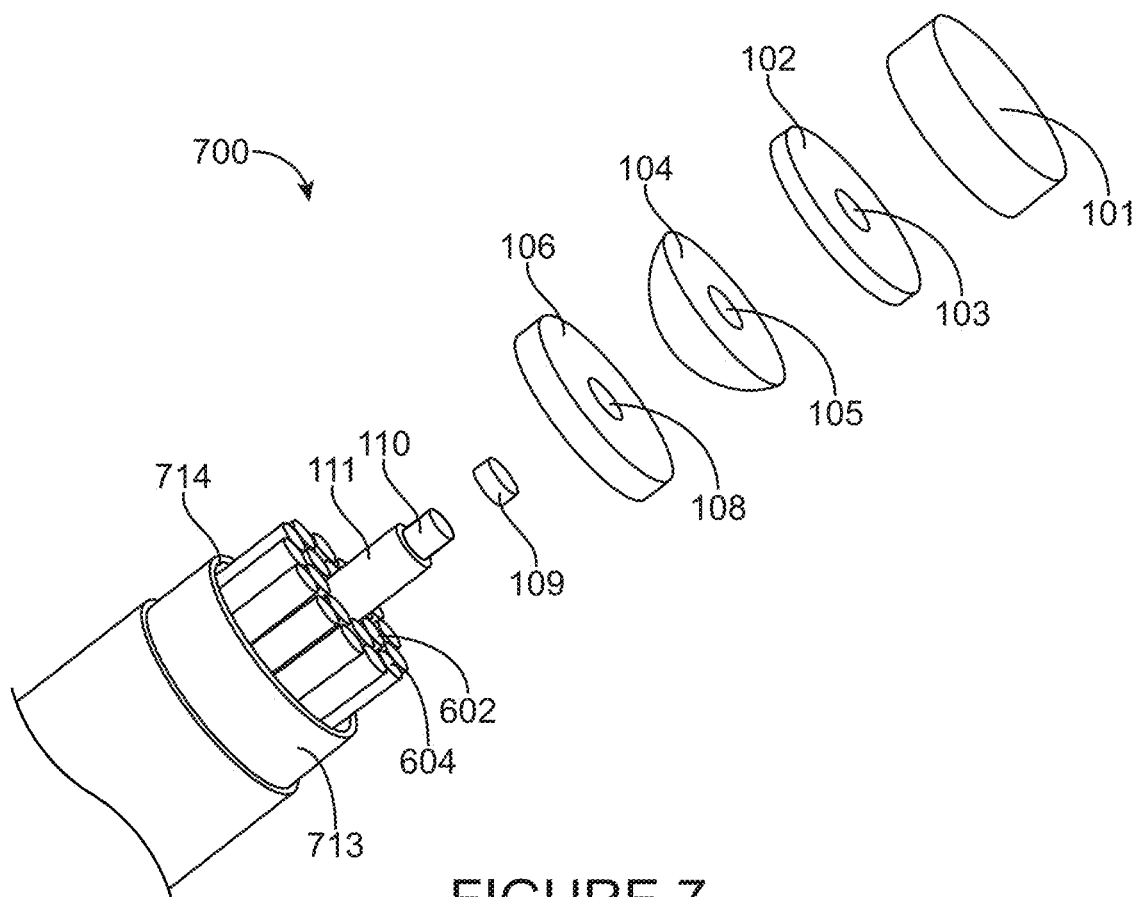
FIG. 7 illustrates an exploded view of a fiber optic probe having a filter forward of the lens, probe components with apertures, an optical isolator, and a multi-ring concentric configuration of collection fibers according to one example of the technology.

FIG. 7 illustrates an exploded view of a probe tip for a fiber optic probe 700 having a lens filter, probe components with apertures, optical isolators, and a multi-ring collection fiber design according to one example of the technology. According to one example, the fiber optic probe 700 may include several components such as a window 101, a lens filter 102 having an aperture 103, a lens 104 with an aperture 105, a collection fiber filter 106 associated with two or more rings of collection fibers 107, the collection fiber filter 106 having an aperture 108, an emission fiber filter 109 associated with one or more emission fibers 110, and a needle tube 111 that prevents light transfer proximate to the probe tip between the emission fibers 110 and the collection fibers 107. According to one example, a carbon black filled epoxy may be used in place of the needle tube 111. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path. According to one example, the component apertures, the needle tube 111, the carbon black filled epoxy, and the like, are referred to as optical isolators herein since they may optically isolate the light delivery path and the light collection path. According to one example, the lens filter 102, the lens 104, and the collection fiber filter 106 may be donut-shaped components. According to one example, the emission fiber filter 109 and the emission fiber 110 may be inserted into or may pass through corresponding apertures in the donut-shaped components when the fiber optic probe 700 is assembled.

According to one example, the fiber optic probe 700 may include a fiber alignment holder 713 that defines a fiber pattern on an end face 714. For example, FIG. 7 illustrates a centrally positioned emission fiber 110 surrounded by a two-ring concentric configuration of collection fibers 107. FIG. 6B illustrates a concentric two-ring 602,604 configuration of optical fibers 107 according to one example. According to one example, the apertures 103,105,108 defined in the fiber optic components may be formed to substantially align with the position of the emission fiber 110 in the fiber alignment holder 713.

According to one example, the multi-ring fiber optic probe 700 enables data collection from different measurement depths within a sample or specimen. For example, the collection fibers 107 associated with the inner ring 602 may collect spectral data from deeper in the specimen. In contrast, the collection fibers 107 associated with the outer ring 604 may collect spectral data from a location closer to the specimen surface. According to one example, the fiber optic probe 700 includes a lens 104 that supports different depth measurements. For example, the fiber optic probe 700 may include a lens 104 that directs light rays captured from different entry angles into the corresponding collection fiber rings 602,604, wherein the different entry angles correspond to different depth measurements for the sample. According to one example, a computer system may be electrically coupled to a spectrometer to capture and analyze spectral data associated with the fiber optic probe. According to one example, the computer system may analyze the spectral data separately for the fiber optic rings 602/604 associated with different measurement depths. For example, the computer system may manipulate the spectral data using mathematical operations and may analyze the spectral data in pre-defined sequences for spectral data obtained from each fiber ring 602,604. According to one example, the computer system may add, subtract, multiply, or perform other mathematical operations on the spectral data associated with the inner and outer rings 602,604.

Figure 8A:
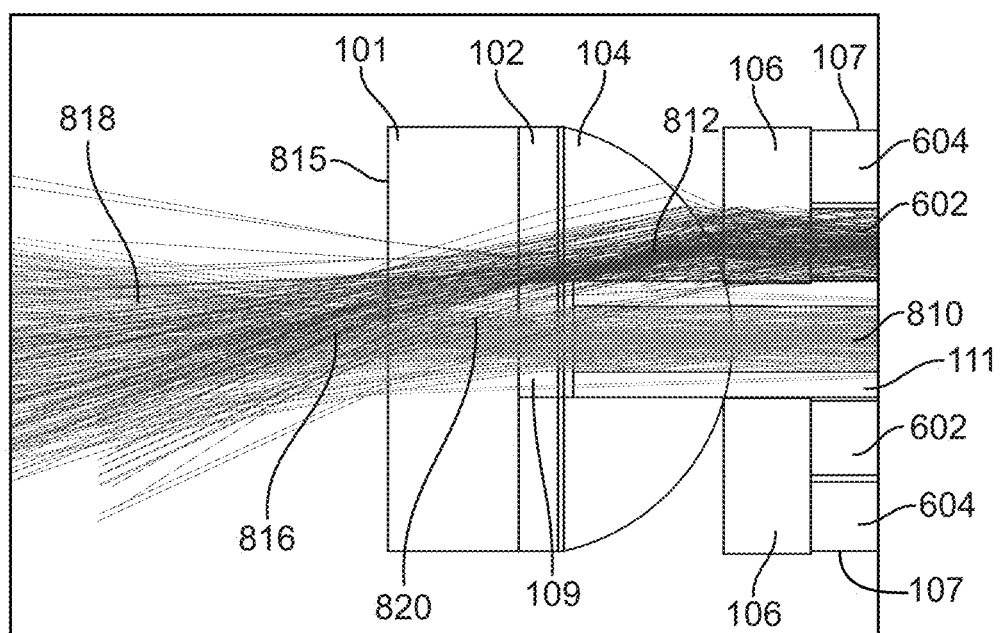
FIG. 8A illustrates a ray trace diagram of a fiber optic probe illustrated in FIG. 7 having a filter forward of the lens, probe components with apertures, an optical isolator, and a multi-ring concentric configuration of collection fibers according to one example of the technology.
Figure 8B:
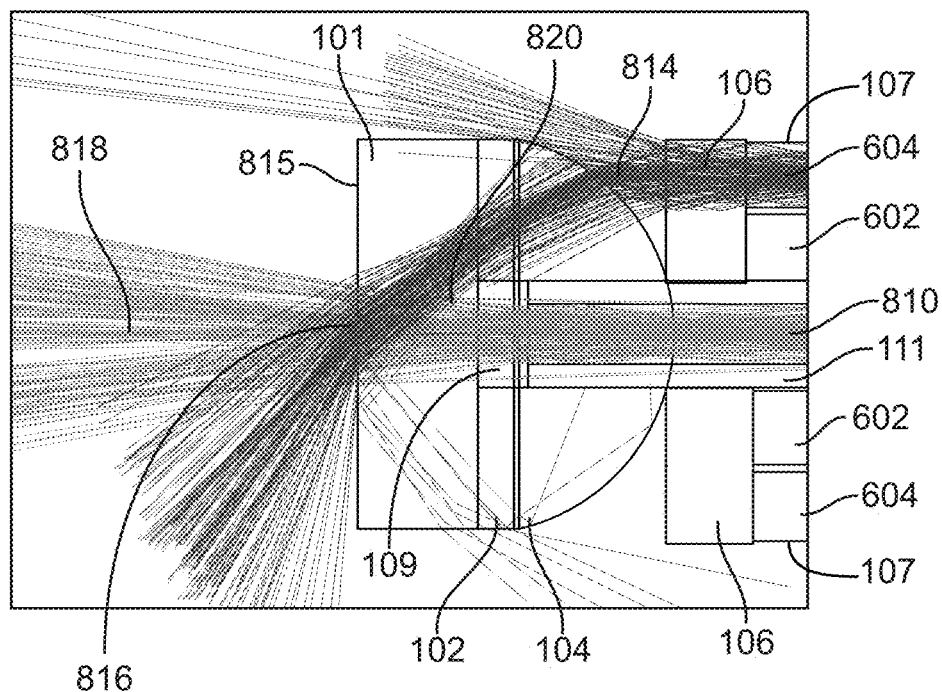
FIG. 8B illustrates a ray trace diagram of a fiber optic probe illustrated in FIG. 7 having a filter forward of the lens, probe components with apertures, an optical isolator, and a multi-ring concentric configuration of collection fibers according to one example of the technology.

FIGS. 8A and 8B illustrate cross-sectional views of the fiber optic probe 700 with light ray traces 812,814 depicting different entry angles associated with the collection fiber rings 602,604, respectively. The first collection fiber ring 602 and the second collection fiber ring 604 include multiple optical fibers 107. To simplify the ray trace illustration, only one light path is illustrated for each fiber ring 602,604. One of ordinary skill in the art will readily appreciate that each optical fiber 107 associated with the fiber rings 602,604 receives the collection light rays substantially simultaneously. According to one example, the different entry angles correspond to different depth measurements for a sample. With reference to FIG. 8A, the emission fiber 110 emits light rays 810 that originate from a laser source and travel through the emission fiber filter 109 and the window 101. According to one example, the emitted light rays 810 impinge a sample. According to one example, a portion of the emitted light rays 810 are scattered or reflected back toward the fiber optic probe 700, while a portion causes the impinged sample to emit a Raman signal. According to one example, the probe 700 receives the reflected light rays and the Raman signal as collection light rays 812. According to one example, the collection light rays 812 impinge the window 101 and are guided through the lens filter 102, the lens 104, and the collection fiber filter 106 before being directed to the inner ring 602, where the collection light rays 812 enter the collection fibers 107 for delivery to a spectrometer. According to one example, the collection light rays 812 impinge the window 101 at a first entry angle that corresponds to a first depth measurement. According to one example, a thickness of the window 101 may be selected so that the distal end 815 is positioned at or proximate to a maximum intensity area 816 defined by an intersection of the emission light rays and the collection light rays. According to one example, if the window 101 is fabricated too thin or too thick, the distal end 815 may be situated in areas of reduced intensity such as reduced intensity areas 818, 820. According to one example, placing the distal end 815 of the window 101 in an area of reduced intensity is not desirable since it may reduce an intensity of collected Raman signals.

With reference to FIG. 8B, the emission fiber 110 emits light rays 810 that originate from a laser source and travel through the emission fiber filter 109 and the window 101. According to one example, the emitted light rays 810 impinge a sample. According to one example, a portion of the emitted light rays 810 are scattered or reflected back toward the fiber optic probe 700, while a portion cause the sample to emit a Raman signal. According to one example, the probe 700 receives the reflected light rays and the Raman signal as collection light rays 814. According to one example, the collection light rays 814 impinge the window 101 and are guided through the lens filter 102, the lens 104, and the collection fiber filter 106 before being directed to the outer ring 604 where the collection light rays 814 enter the collection fibers 107 for delivery to a spectrometer. According to one example, the collection light rays 814 impinge the window 101 at a second entry angle that corresponds to a second depth measurement. According to one example, a thickness of the window 101 may be selected so that the distal end 815 is positioned at or proximate to a maximum intensity area 816 defined by an intersection of the emission light rays and the collection light rays. According to one example, if the window 101 is fabricated too thin or too thick, the distal end 815 may be situated in areas of reduced intensity such as reduced intensity areas 818, 820. According to one example, placing the distal end 815 of the window 101 in an area of reduced intensity is not desirable since it may reduce an intensity of collected Raman signals. FIGS. 8A and 8B illustrate separate ray trace diagrams for the two ring collection fibers in order to simplify the illustration and explanation. One of ordinary skill in the art will readily appreciate that data collection may occur simultaneously for the multi-rings.

According to one example, the first entry angle associated with the collection light rays 812 is smaller than the second entry angle associated with the collection light rays 814. FIG. 8A confirms that the first entry angle associated with the collection light rays 812 approaches the window 101 closer to a perpendicular angle. Thus, the first depth measurement associated with the first entry angle penetrates more deeply into the sample. FIG. 8B confirms that the second entry angle associated with the collection light rays 814 approaches the window 101 closer to a parallel angle. Thus, the second depth measurement associated with the second entry angle penetrates shallower into the sample.

According to one example, the spectral data received at the fiber optic probe 700 correspond to different depth measurements and may be used to identify locations of interest within the sample. For example, the depth measurements may be used to identify proximity of the fiber optic probe 700 to a surface, a marker, a transition point, or the like. Furthermore, the depth measurements may be used to determine a tissue thickness, a tumor size, a tissue type such as normal, abnormal, muscle, fat, tendon, ligament, or the like. Still further, the depth measurements may be used to alert a surgeon when the fiber optic probe 700 is near an organ, near a tumor, or approaching a tumor edge or the like. According to one example, the depth measurements may be used to identify when the fiber optic probe 700 is approaching a transition between healthy tissue and abnormal tissue such as a tumor, dead tissue, or the like. Accordingly, a surgeon may employ the depth measurements to determine a tumor boundary or margin before removal.

Figure 9:
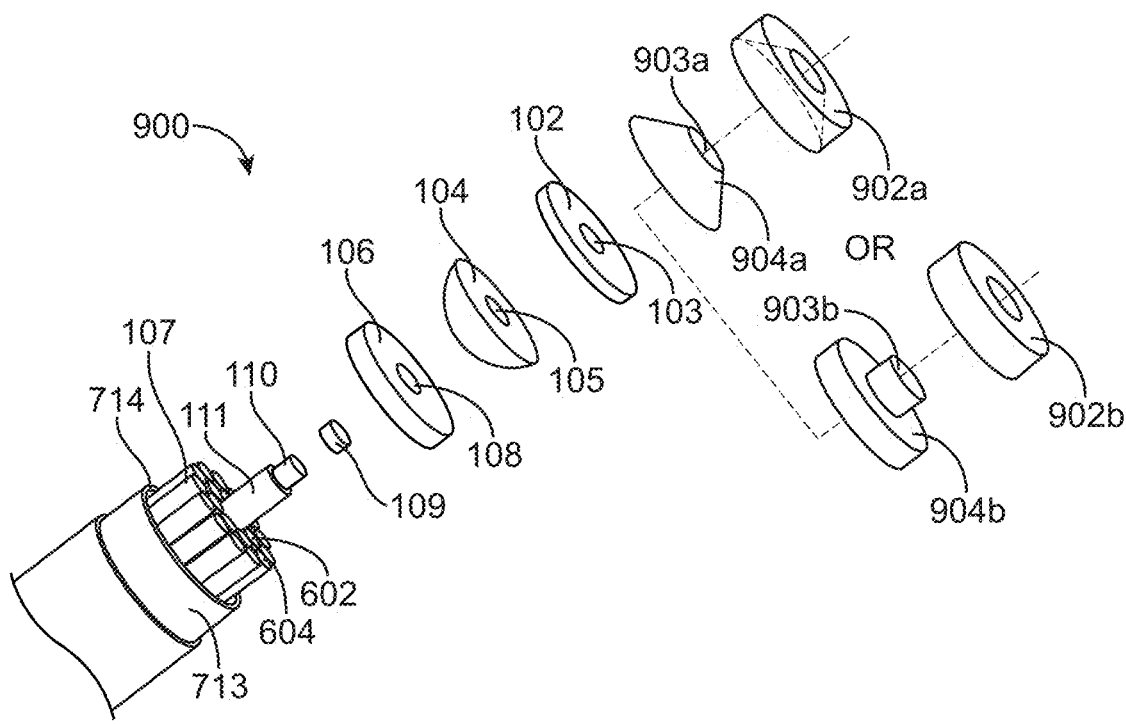
FIG. 9 illustrates an exploded view of a fiber optic probe having alternative restricted windows, a filter forward of the lens, probe components with apertures, an optical isolator, and a multi-ring concentric configuration of collection fibers according to one example of the technology.

FIG. 9 illustrates an exploded view of a probe tip for a fiber optic probe 900 having a lens filter, probe components with apertures, optical isolators, a multi-ring collection fiber design, and a window block according to one example of the technology. For purposes of efficiency in reducing an overall number of figures, FIG. 9 illustrates alternative window blocks 902a and 902b and corresponding windows 904a, 904b, respectively, positioned over relevant fiber optic probe components. According to one example, the fiber optic probe 900 may include several fiber optic probe components such as a window block 902a or 902b, a window 904a, 904b, a lens filter 102 having an aperture 103, a lens 104 with an aperture 105, a collection fiber filter 106 associated with two or more rings 602, 604 of collection fibers 107, the collection fiber filter 106 having an aperture 108, an emission fiber filter 109 associated with one or more emission fibers 110, and a needle tube 111 that prevents light transfer proximate to the probe tip between the emission fibers 110 and the collection fibers 107. According to one example, a carbon black filled epoxy may be used in place of the needle tube 111. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path. According to one example, the component apertures, the needle tube 311, the carbon black filled epoxy, and the like, are referred to as optical isolators herein since they may optically isolate the light delivery path and the light collection path. FIG. 6B illustrates a concentric two ring 602, 604 configuration of optical fibers 107 according to one example. According to one example, the lens filter 102, the lens 104, and the collection fiber filter 106 may be annular or donut-shaped components. According to one example, the emission fiber filter 109 and the emission fiber 110 may be inserted into or may pass through corresponding apertures in the donut-shaped components when the fiber optic probe 900 is assembled. According to one example, the fiber optic probe 900 may include a fiber alignment holder 913 that defines a fiber pattern on an end face 914.

According to one example, the window 904a,904b may be formed having a spatial opening at the tip. According to one example, the window 904a,904b may include a smaller forward-facing window 903a,903b that restricts a surface area associated with a clear opening of the fiber optic probe 900. According to one example, the window 904a may be formed in a truncated cone shape. Alternatively, the window 904b may be formed in a disc shape with a protruding cylinder. One drawback with the truncated cone-shaped window 904a is that a diameter of the forward-facing window 903a may become enlarged when the window block 902a is polished during manufacture. In contrast, the forward-facing window 903b of the disc-shaped with protrusion window 904b remains substantially equivalent in diameter when the window block 902b is polished during manufacture. According to one example, the window 904a, 904b may be constructed of one or more materials such as magnesium fluoride ($MgF_2$), fused silica, sapphire, or the like, that are transparent to light rays over a wide range of wavelengths and avoid spectral interference or noise signals.

According to one example, the window block 902b placed over the disc-shaped with protrusion window 904b may be donut-shaped. According to one example, the window block 902b may be formed from a light blocking material such stainless steel, black plastic, or the like, that is coupled to the disc-shape with protrusion window 904b. According to one example, the window block 902b may be coupled to the disc-shaped with protrusion window 904b using an epoxy such as a light absorbing epoxy including a carbon black-loaded epoxy. According to another example, the disc-shaped with protrusion window 904b may be coated with a carbon black filled epoxy. In this case, the window block 902b may be omitted. According to another example, the disc-shaped with protrusion window 904b may be coated with an epoxy to reduce or minimize any stray or unwanted light from entering the probe tip, which reduces a chance the stray or unwanted light will enter the collection fibers 107.

Figure 10A:
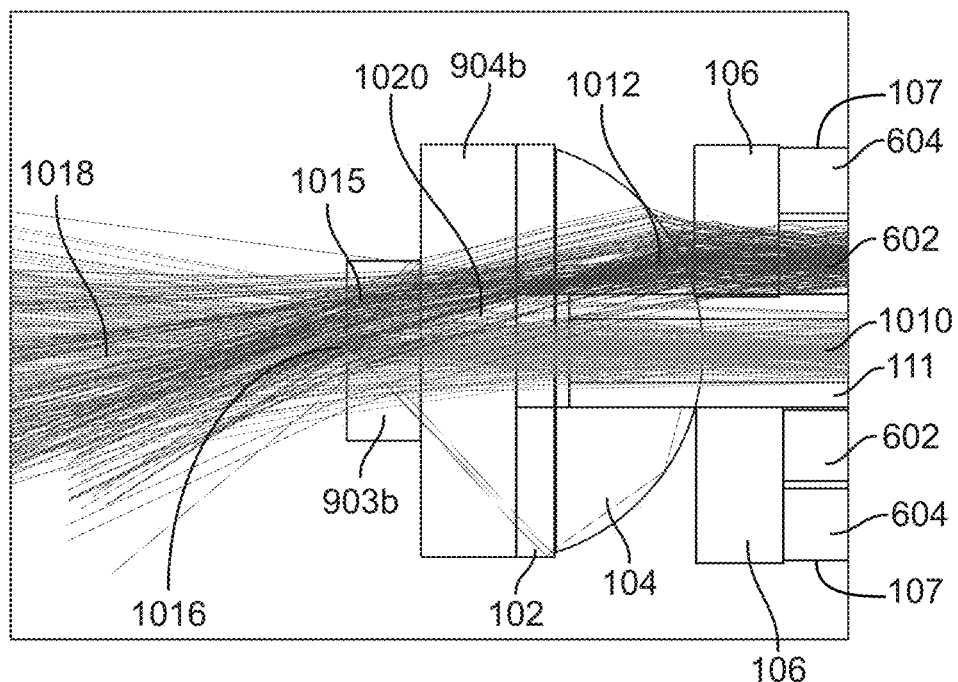
FIG. 10A illustrates a ray trace diagram of a fiber optic probe illustrated in FIG. 9 having alternative restricted windows, a filter forward of the lens, probe components with apertures, an optical isolator, and a multi-ring concentric configuration of collection fibers according to one example of the technology.
Figure 10B:
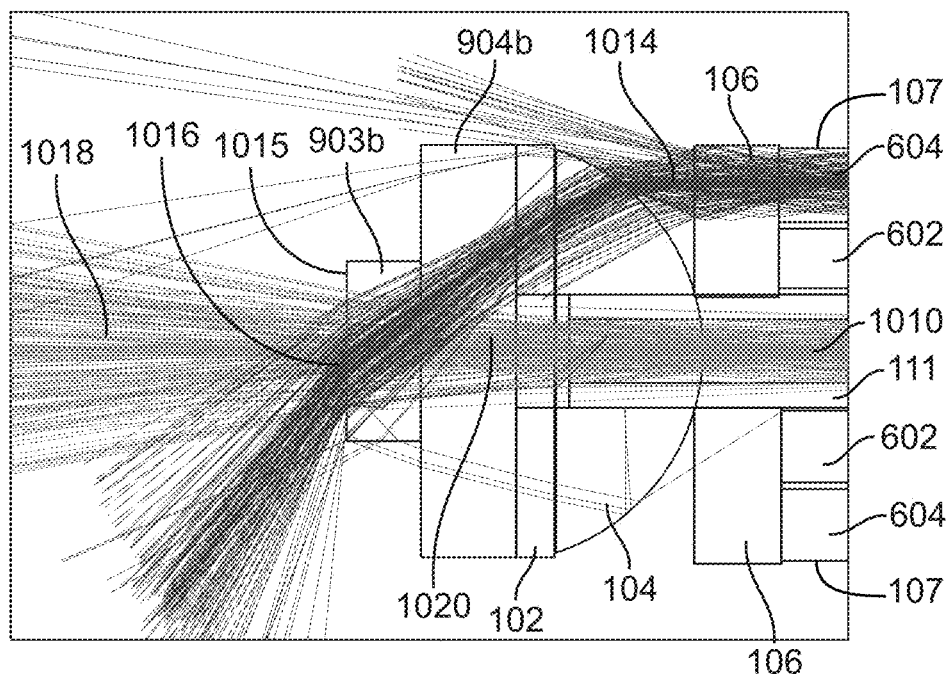
FIG. 10B illustrates a ray trace diagram of a fiber optic probe illustrated in FIG. 9 having alternative restricted windows, a filter forward of the lens, probe components with apertures, an optical isolator, and a multi-ring concentric configuration of collection fibers according to one example of the technology.

FIGS. 10A and 10B illustrate cross-sectional views of the fiber optic probe 900 having the disc-shaped with protrusion window 904b and light ray traces 1012,1014 depicting different entry angles associated with the collection fiber rings 602,604, respectively. To simplify the ray trace illustration, only one light path is illustrated for each fiber ring 602,604. One of ordinary skill in the art will readily appreciate that each optical fiber 107 associated with the fiber rings 602,604 receives the collection light rays substantially simultaneously. With reference to FIG. 10A, the emission fiber 110 emits light rays 1010 that originate from a laser source and travel through the emission fiber filter 109 and the window 904b. According to one example, the emitted light rays 1010 impinge a sample. According to one example, a portion of the emitted light rays 1010 are scattered or reflected back toward the fiber optic probe 900, while a portion cause the impinged sample to emit a Raman signal. According to one example, the probe 900 receives the reflected light rays and the Raman signal as collection light rays 1012. According to one example, the collection light rays 1012 impinge the window 904b and are guided through the lens filter 102, the lens 104, and the collection fiber filter 106 before being directed to the inner ring 602, where the collection light rays 1012 enter the collection fibers 107 for delivery to a spectrometer. According to one example, the collection light rays 1012 impinge the window 904b at a first entry angle that corresponds to a first depth measurement. According to one example, a thickness of the window 904a,904b may be selected so that the distal end 1015 is positioned at or proximate to a maximum intensity area 1016 defined by an intersection of the emission light rays and the collection light rays. According to one example, if the window 904a,904b is fabricated too thin or too thick, the distal end 1015 may be situated in areas of reduced intensity such as reduced intensity areas 1018, 1020. According to one example, placing the distal end 1015 of the window 904a,904b in an area of reduced intensity is not desirable since it may reduce an intensity of collected Raman signals.

With reference to FIG. 10B, the emission fiber 110 emits light rays 1010 that originate from a laser source and travel through the emission fiber filter 109 and the window 904b. According to one example, the emitted light rays 1010 impinge a sample. According to one example, a portion of the emitted light rays 1010 are scattered or reflected back toward the fiber optic probe 900, while a portion cause the sample to emit a Raman signal. According to one example, the probe 900 receives the reflected light rays and the Raman signal as collection light rays 1014. According to one example, the collection light rays 1014 impinge the window 904b and are guided through the lens filter 102, the lens 104, and the collection fiber filter 106 before being directed to the outer ring 604 where the collection light rays 1014 enter the collection fibers 107 for delivery to a spectrometer. According to one example, the collection light rays 1014 impinge the window 904b at a second entry angle that corresponds to a second depth measurement. According to one example, a thickness of the window 904a,904b may be selected so that the distal end 1015 is positioned at or proximate to a maximum intensity area 1016 defined by an intersection of the emission light rays and the collection light rays. According to one example, if the window 904a,904b is fabricated too thin or too thick, the distal end 1015 may be situated in areas of reduced intensity such as reduced intensity areas 1018, 1020. According to one example, placing the distal end 1015 of the window 904a,904b in an area of reduced intensity is not desirable since it may reduce an intensity of collected Raman signals.

According to one example, the first entry angle associated with the collection light rays 1012 is smaller than the second entry angle associated with the collection light rays 1014. FIG. 10A confirms that the first entry angle associated with the collection light rays 1012 approaches the smaller forward-facing window 903b closer to a perpendicular angle. Thus, the first depth measurement associated with the first entry angle penetrates more deeply into the sample. FIG. 10B confirms that the second entry angle associated with the collection light rays 1014 approaches the smaller forward-facing window 903b closer to a parallel angle. Thus, the second depth measurement associated with the second entry angle penetrates shallower into the sample.

Figure 11:
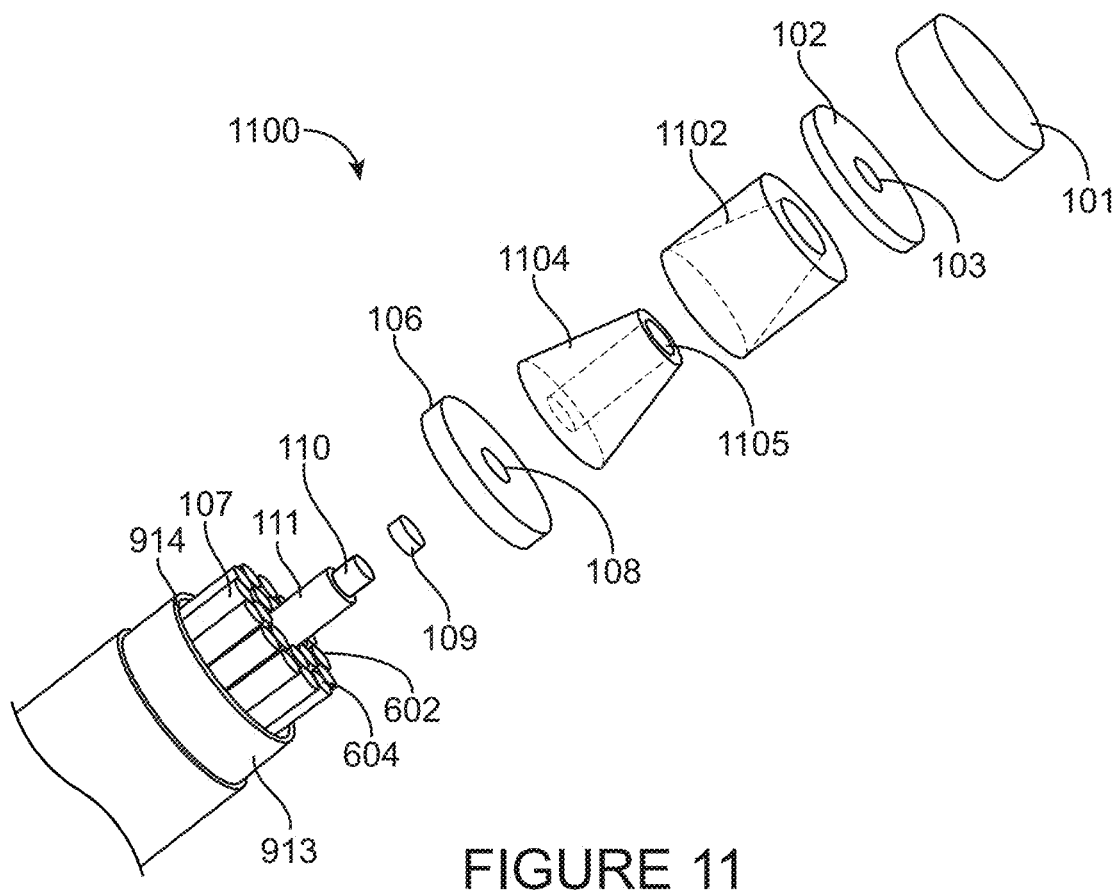
FIG. 11 illustrates an exploded view of a fiber optic probe having a filter forward of the lens, a total internal reflectance lens, probe components with apertures, an optical isolator, and a multi-ring concentric configuration of collection fibers according to one example of the technology.

FIG. 11 illustrates an exploded view of a probe tip for a fiber optic probe 1100 having a lens filter, probe components with apertures, optical isolators, a multi-ring collection fiber design, and a light block component according to one example of the technology. According to one example, the fiber optic probe 1100 may include several fiber optic probe components such as a window 101, a lens filter 102 having an aperture 103, a light blocking component 1102, a lens 1104 with an aperture 1105, a collection fiber filter 106 associated with two or more rings 602,604 of collection fibers 107, the collection fiber filter 106 having an aperture 108, an emission fiber filter 109 associated with one or more emission fibers 110, and a needle tube 111 that prevents light transfer proximate to the probe tip between the emission fibers 110 and the collection fibers 107. According to one example, a carbon black filled epoxy may be used in place of the needle tube 111. According to one example, the components include a distal end located forward or upstream of the probe and a proximal end located downstream of the probe. According to one example, the distal and proximal ends are provided at component interfaces. According to one example, the distal and proximal ends may be positioned substantially perpendicular to the light path. According to one example, the component apertures, the needle tube 111, the carbon black filled epoxy, and the like, are referred to as optical isolators herein since they may optically isolate the light delivery path and the light collection path. FIG. 6B illustrates a concentric two ring 602,604 configuration of optical fibers 107 according to one example. According to one example, the lens filter 102 and the collection fiber filter 106 may be annular or donut-shaped components. According to one example, the lens 1104 may include a parabolic or truncated cone-shape designed for total internal reflection. According to one example, the lens 1104 may include an aperture 1105 formed therethrough. According to one example, the emission fiber filter 109 and the emission fiber 110 may be inserted into or may pass through corresponding apertures in the probe components when the fiber optic probe 1100 is assembled.

According to one example, the lens 1104 may be formed as a single component lens. For example, the lens 1104 may be formed as a single component lens having a truncated cone shape. Alternatively, the lens 1104 may be formed as a multi-component lens. According to one example, the lens 1104 may include an inner portion formed from a material that is transparent to light rays over a wide range of wavelengths and an outer portion having a lower refractive index. In other words, the lens 1104 may be constructed to form a waveguide. For example, the inner portion of the lens 1104 may be formed from sapphire and the outer portion of the lens 1104 may be formed from an ultra-violet (UV) cured epoxy, a two-component epoxy, Teflon® amorphous fluoropolymer (AF) resins, or the like. According to one example, the outer portion of the lens 1104 may have a low refractive index material that is deposited on the surface by evaporation, sputtering, or other deposition techniques. According to another example, the entire lens 1104 may be formed from a transparent material as long as the material does not interfere with the spectroscopic measurement. For example, transparent or low index materials may include $MgF_2$, fused silica, sapphire, calcium fluoride ($CaF_2$), barium fluoride ($BaF_2$), clear polymers, or the like. According to one example, air may be used as a low index material if steps are taken to ensure the air gap is maintained. According to one example, materials other than $MgF_2$ may allow additional low index covering materials to achieve total internal reflectance (TIR). With respect to clear polymers, these may include fluoropolymers, chlorofluoro polymers, acrylic, polycarbonate, or the like.

According to one example, a shape of the lens 1104 may be selected to achieve a desired depth measurement for the sample. For example, a shape of the parabola or an angle of the cone surface may be selected to achieve a desired depth measurement for the sample. In other words, the shape of the lens 1104 determines entry angles for the collected light rays received from the sample. Furthermore, the size of the aperture 1105 may determine a size of the interrogation spot impinged by the excitation laser light. According to one example, a larger interrogation spot may provide more excitation laser light and a smaller interrogation spot may provide less excitation laser light. Still further, the window 101 placed over the probe components may be designed to further define the spatial measurement area. For example, a smaller diameter window 101 may restrict entry of collected laser light or Raman signal while a larger diameter window 101 may allow entry of more collected laser light or Raman signal. According to one example, the window 101 may be used to maximize overlap or to protect the probe elements.

Figure 12:
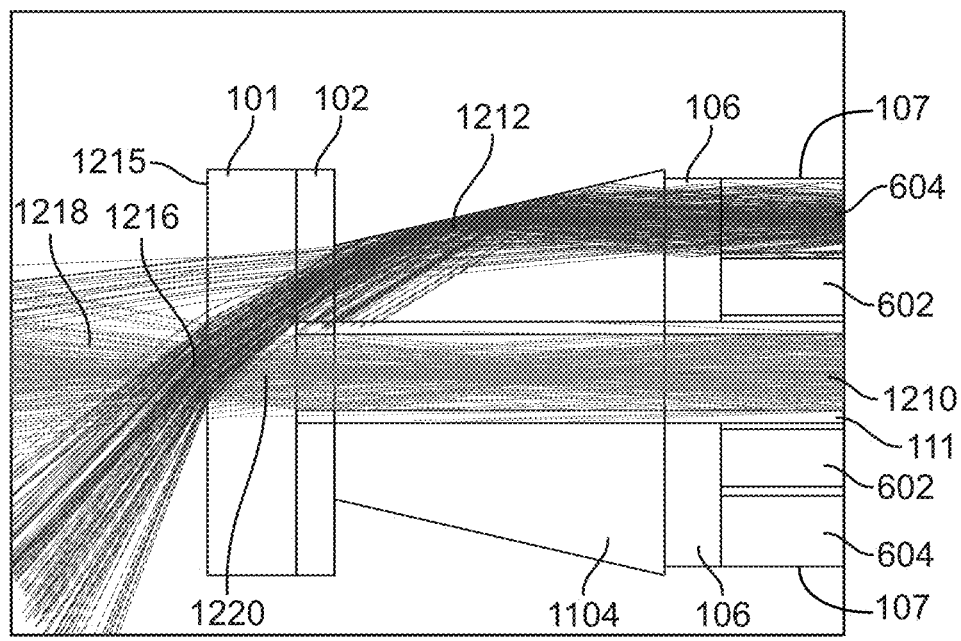
FIG. 12 illustrates a ray trace diagram of a fiber optic probe illustrated in FIG. 11 having a filter forward of the lens, a total internal reflectance lens, probe components with apertures, an optical isolator, and a multi-ring concentric configuration of collection fibers according to one example of the technology.

FIG. 12 illustrates a cross-sectional view of the fiber optic probe 1100 having the TIR truncated cone-shaped lens 1104 and light ray trace 1212 depicting an entry angle associated with the collection fiber rings 602,604, respectively. To simplify the ray trace illustration, only one light path is illustrated for fiber ring 604. One of ordinary skill in the art will readily appreciate that each optical fiber 107 associated with the fiber rings 602,604 receives the collection light rays substantially simultaneously. According to one example, the different entry angles correspond to different depth measurements for a sample. The emission fiber 110 emits light rays 1210 that originate from a laser source and travel through the emission fiber filter 109 and the window 101. According to one example, the emitted light rays 1210 impinge a sample.

According to one example, a portion of the emitted light rays 1210 are scattered or reflected back toward the fiber optic probe 1100, while a portion causes the impinged sample to emit a Raman signal. According to one example, the probe 1100 receives the reflected light rays and the Raman signal as collection light rays 1212. According to one example, the collection light rays 1212 impinge the window 101 and are guided through the lens filter 102, the lens 1104, and the collection fiber filter 106 before being directed to the outer ring 602, where the collection light rays 1212 enter the collection fibers 107 for delivery to a spectrometer. According to one example, the collection light rays 1212 impinge the window 101 at a first entry angle that corresponds to a first depth measurement. According to one example, a thickness of the window 101 may be selected so that the distal end 1215 is positioned at or proximate to a maximum intensity area 1216 defined by an intersection of the emission light rays and the collection light rays. According to one example, if the window 101 is fabricated too thin or too thick, the distal end 1215 may be situated in areas of reduced intensity such as reduced intensity areas 1218, 1220. According to one example, placing the distal end 1215 of the window 101 in an area of reduced intensity is not desirable since it may reduce an intensity of collected Raman signals.

While not shown, a portion of the collection light rays are also directed to the collection fibers 107 corresponding to the inner ring 602 for delivery to a spectrometer. One of ordinary skill in the art will readily appreciate that the TIR lens may be constructed of various shapes, dimensions, or the like, to allow different depth measurements. Furthermore, the TIR lens may include different surface angles that allow different depth measurements.

Figure 13:
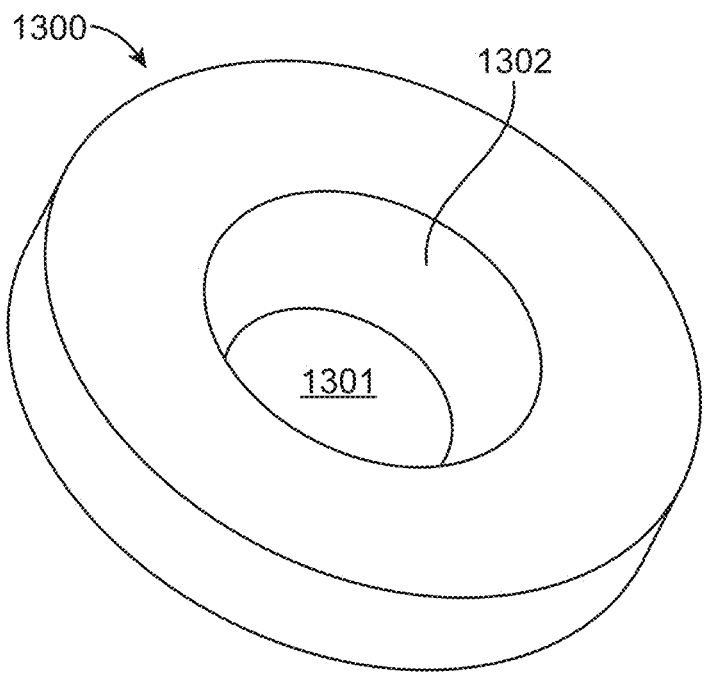
FIG. 13 illustrates a perspective view of a lens with one active facet and an aperture according to one example of the technology.
Figure 14:
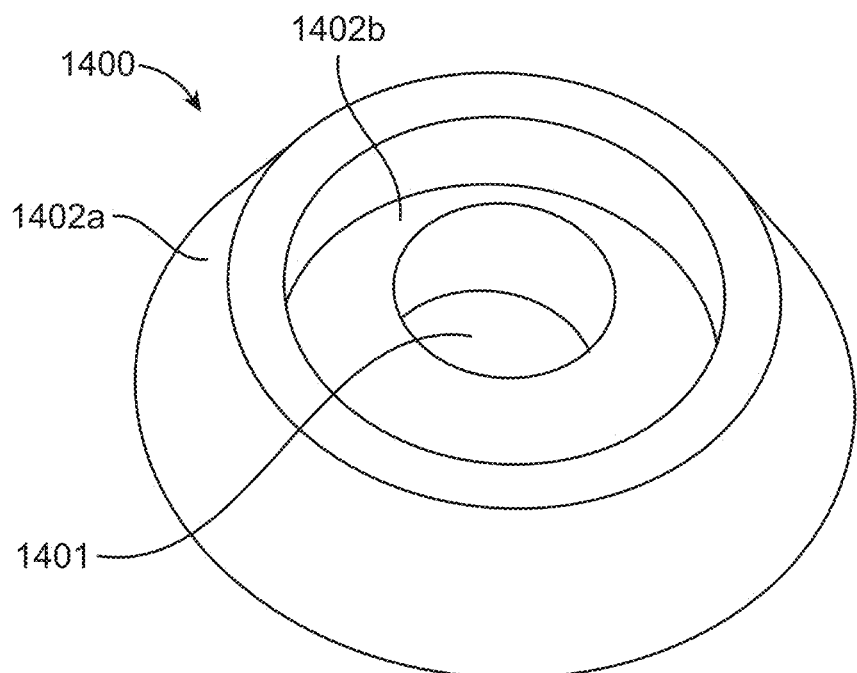
FIG. 14 illustrates a perspective view of a lens with two active facets and an aperture according to one example of the technology.

According to one example, the lens components 104,204, 304,404 described throughout this disclosure may include any desired configuration that manipulates light rays passing therethrough. According to one example, the lens components 104,204,304,404 may include a single piece construction. Alternatively, the lens components 104,204,304,404 may include a multi-piece construction. The technology further provides novel and non-obvious lens components having facets. With reference to FIG. 13, the lens 1300 includes an aperture 1301 and an active facet 1302 having a flat surface oriented at a desired angle to form a refractive, reflective, or total internally reflective structure, among other structures. With reference to FIG. 14, the lens 1400 includes an aperture 1401 and facets 1402a,1402b having curved surfaces that form refractive, reflective, or total internally reflective structures, among other structures. According to one example, the lens may include facets having a combination of curved and flat surfaces oriented at desired angles to form refractive, reflective, or total internally reflective structures, among other structures. According to one example, the lens may include three refractive rings, which may correlate to the emission fibers 110 and a two-ring pattern of the collection fibers 107, as illustrated in FIG. 6B.

According to one example, the lens may include facets having flat surfaces that allow light rays to pass therethrough substantially unaltered. For example, the flat surface may be oriented substantially perpendicular to a light path that enters the lens. According to one example, the lens may include facets with a viewing path that is unobstructed by the lens refractive/reflective surfaces. According to one example, the fiber optic probes described herein may include an imaging bundle or camera positioned proximate to the facets having the unobstructed viewing path. According to one example, the unobstructed viewing path may be formed at a center of the lens, among other locations. The unobstructed viewing path may be beneficial for fiber optic probes that combine spectroscopy with camera images, imaging bundles, optical coherence tomography (OCT) fibers, or the like.

According to one example, a facet configuration may be selected to separately achieve desired illumination depths and collection efficiencies. According to one example, the facet configurations may be selected to adjust a height, width, thickness, and shape of a refractive or reflective feature in order to maximize fiber optic probe performance. According to one example, the facet configurations may be adjusted to control light ray entry or exit angles. In contrast, conventional spherical or aspheric lenses offer less control over light ray entry or exit angles. According to one example, the lens may be configured to set an opening size at a specific value to provide a desired interrogation spot, region, depth, or the like. According to one example, the lens may include separate lenses that perform depth measurements. According to one example, the fiber optic probes may include a depth measuring lens positioned at a peripheral location.

According to one example, the lens may include a facet having a refractive, reflective, or total internally reflective angle that captures collection light from an angle that is outward and away from the emission light rays. According to one example, this configuration enables sub-surface or depth measurements. According to one example, the depth measurements obtained from the fiber optic probes may be substantially equivalent to depth measurements obtained from spatially offset Raman spectroscopy (SORS). According to one example, a detector may be provided to receive refracted, scattered, or reflected light signals from the collection fibers 107, along with a corresponding collection position. According to one example, the collection position may be associated with a quadrant position or the like. According to one example, the system may employ spectral position information obtained from the individual fibers 107 to determine a direction from which the collection light was received. According to one example, the spectral position information may be used to determine a direction the fiber optic probe may be moved to gather additional relevant spectra.

According to another example, the fiber optic probe may be configured to offset an angle of the emission light rays in an outward direction and may include collection fibers 107 located proximate the emission fiber 110 to capture the collected light rays. According to one example, a surface probe may be inserted into the aperture of the lens to obtain collected light rays. According to one example, the emission fiber 110 may be employed to obtain both refracted and scattered or reflected light rays. According to yet another example, the fiber optic probe may include a separate lens associated with each fiber or fiber group.

According to one example, the lens may include facets positioned and oriented to maximize the performance of the fiber optic probe for particular applications. For example, the lens may include a plurality of facets oriented at selected angles and positions relative to optical fibers, light rays, and other facets to maximize performance of the fiber optic probe for particular applications. According to one example, custom lens designs allow optical fibers to be positioned closer to refractive or reflective surfaces. In contrast, conventional spherical lens designs may introduce losses due to vignetting, which is a reduction of image brightness or saturation proximate to a lens periphery as compared to a center of the lens image. According to one example, a lens having a plurality of facets may provide a fiber optic probe with a short focal length. Generally, conventional lenses perform poorly with fiber optic probes having a high number of optical fibers associated with an increased probe diameter because the lens diameter must be increased accordingly to accommodate the high number of optical fibers, which causes a low numerical aperture associated with low light collection.

According to one example, a plurality of facets may be oriented relative to an optical fiber arrangement associated with the fiber optic probe. For example, the plurality of facets may be oriented to accommodate a ring pattern arrangement of optical fibers 107. According to another example, the plurality of facets may be oriented relative to light ray entry or exit angles associated with the fiber optic probe. According to yet another example, the plurality of facets may be oriented relative to adjacent facets within the fiber optic probe. According to another example, the plurality of facets may be static such that the facet orientation is unchanged after manufacture. One of ordinary skill in the art will readily appreciate that a plurality of facets may be oriented to accommodate any pattern of optical fibers provided in the fiber optic probe, any light ray entry or exit angles associated with the fiber optic probe, or any arrangements of other facets in the fiber optic probe.

According to one example, the lens with facets may be placed or deposited over the collection fiber filter 106, the emission fiber filter 109, the collection fibers 107, or the emission fiber 110. For example, the lens with facets may be placed or deposited directly on top of the collection fiber filter 106, the emission fiber filter 109, the collection fibers 107, or the emission fiber 110. According to another example, the lens with facets may be formed of a multi-piece design such that separate lens portions may be placed or deposited over the collection fiber filter 106, the emissions fiber filter 109, the collection fibers 107, or the emission fiber 110. According to one example, the collection fiber filter 106 and the emissions fiber filter 109 may be placed over the collection fibers 107 and the emission fiber 110, respectively. According to another example, different filters may be placed over individual or multiple optical fibers. According to one example, providing different filters over individual or multiple optical fibers renders a fiber optic probe capable of performing multiple spectroscopic techniques. According to one example, a same fiber optic probe may perform multiple emissions wavelength Raman or other spectroscopy, including utilizing time gated Raman.

According to one example, the lens with facets offers several advantages over conventional lenses. For example, the facets offer control over custom lens designs. Furthermore, the facets enable the design and fabrication of thin and light weight lenses, among providing other benefits.

FIG. 13 illustrates the lens 1300 having an aperture 1301 and an active facet 1302 having an angled surface or a truncated cone-shaped central portion that defines a perimeter of the aperture 1301. With reference to FIGS. 1 and 13, the lens 1300 functions substantially equivalent to the lens 104 and may replace it. According to one example, the aperture 1301 allows the emission light rays to pass through the lens 1300 substantially unaltered. According to one example, one or more of the emission fibers 110, the needle tube 111, a collimating lens, or the emission fiber filter 109 may be configured to align or pass through the aperture 1301. According to one example, a portion of the emission light rays are scattered or reflected back toward the fiber optic probe 100, while a portion causes the impinged sample to emit a Raman signal. According to one example, the probe 100 receives the reflected light rays and the Raman signal as collection light rays. According to one example, the collection light rays impinge the window 101 and are guided through the lens filter 102 to the lens 1300 where they impinge upon the active facet 1302 before being directed toward the collection fibers 107 for delivery to the spectrometer. With reference to FIG. 6A, the position and surface angle for the active facet 1302 are selected to correspond to the single ring 701 configuration defined by the collection fibers 107. According to one example, the position and surface angle for the active facet 1302 may be selected to achieve a desired depth measurement. According to one example, the facet 1302 is an angled refractive surface. The remaining facets depicted in the lens 1300 are non-active facets that do not contribute light rays to the collection fiber arrangements. According to one example, the fiber optic probe 100 may include a single piece or multi-piece lens 1300.

According to another example, the lens 1300 may include a single refractive or reflective step that is curled in spiral pattern (not shown), instead of employing discrete annular rings. According to yet another example, the facets may be arranged in a partial ring. For example, the facets may be arranged in a partial ring that corresponds to one or more quadrants. Still further, the facets may be arranged to correspond to individual fibers. According to one example, the lens 1300 may utilize reflective facets that provide total internal reflection. According to another example, the lens 1300 may utilize reflective facets, with or without refractive facets.

With respect to filters, a laser blocking filter may be disposed forward or upstream of the collection fibers to prevent undesired light rays from entering the collection fibers. According to one example, the collection fiber filter 106 associated with the collection fibers 107 may include a laser blocking filter. Furthermore, a laser blocking filter may be used at the delivery end of an optical fiber to remove silica Raman bands contributed by an optical fiber itself before it illuminates a sample. According to one example, the emission fiber filter 109 associated with the emission fibers 110 may include a laser cleanup filter. According to one example, the collection fiber filter 106 and the emission fiber filter 109 may be designed to match the configuration of the corresponding collection fibers 107 and emission fibers 110.

According to one example, the fiber optic probes may include a collimating lens associated with the emission fibers 110. According to one example, the collimating lens may include a GRIN (gradient index) or other collimating lens. According to another example, the GRIN lens may be eliminated. According to one example, the collimating lens may be mounted on the needle tube 111 to prevent light transfer proximate to the probe tip between the emission fibers 110 and the collection fibers 107. According to one example, the needle tube 111 may surround or encapsulate the emission fibers 110 and the emission fiber filter 109 and may extend to the proximal face of the window 101 in order to optically isolate the emission fibers 110 and the collection fibers 107.

According to one example, the lenses may be fabricated using mass production techniques. For example, the lens may be fabricated using UV/2 photon cured resins such as Nanoscribe or other polymers utilizing techniques like photolithography, UV cured polymer stamping, thermal imprinting, injection molding or other molding technique, stereolithographic printing, other 3D printing techniques, or the like. According to another example, the lens may be fabricated using molded glass that enables lens manufacturing with higher refractive index glasses. According to yet another example, the lens may be fabricated using sol gel or single point diamond turning, among other polishing techniques.

According to one example, the fiber optic probe may include a separate lens for each fiber or fiber group. According to one example, the lens may include a complex shape with multiple facets defining a central portion having multiple refractive and reflective surfaces. According to one example, the central portion allows light rays to pass through the lens unobstructed. According to one example, one or more of the emission fibers 110 and the emission filter 109 may be configured to align with the center portion having active facets that angle the light rays toward the collection fibers 107. According to one example, the active facets may employ reflection or refraction to guide light rays to a corresponding one of the two rings 602,604 of collection fibers 107. According to one example, the facets may represent reflective or refractive rings that match up with the two-ring geometry 602,604 of the collection fibers 107. According to one example, the fiber optic probe may include a single piece or multi-piece lens having facets that measure surface features.

FIG. 14 illustrates a lens 1400 having an aperture 1401 and two active facets 1402a,1402b having angled surfaces. With reference to FIGS. 7 and 14, the lens 1400 functions substantially equivalent to the lens 104 and may replace it. According to one example, the aperture 1401 allows the emission light rays to pass through the lens 1400 substantially unaltered. According to one example, the aperture 1401 may align with the emission optical fibers 110. According to one example, one or more of the emission fibers 110, the needle tube 111, a collimating lens, or the emission fiber filter 109 may be configured to align or pass through the aperture 1401. According to one example, the needle tube 111 may be omitted and replaced with a carbon black filled epoxy. According to one example, the collected light rays that reflect off or are emitted from the sample are guided to the lens 1400 where they impinge upon the active facets 1402a,1402b before being directed toward the collection fibers 107 for delivery to the spectrometer. With reference to FIG. 6B, the positions and surface angles for the active facets 1402a,1402b are selected to correspond to the two ring 602,604 configuration defined by the collection fibers 107. According to one example, the positions and surface angles for the active facets 1402a,1402b may be selected to achieve desired depth measurements.

According to one example, the facets 1402a,1402b are angled refractive surfaces. The remaining facets depicted in the lens 1400 are non-active facets that do not contribute light rays to the collection fiber arrangements. According to one example, the facet 1402a is an angled refractive surface that is aligned with an outer ring 604 of collection optical fibers 107. According to one example, facet 1402b is an angled refractive surface that is aligned with an inner ring 602 of collection optical fibers 107.

According to another example, the lens 1400 may include a single refractive or reflective step that is curled in spiral pattern (not shown), instead of employing discrete annular rings. According to yet another example, the facets may be arranged in a partial ring. For example, the facets may be arranged in a partial ring that corresponds to one or more quadrants. Still further, the facets may be arranged to correspond to individual fibers. According to one example, the lens may utilize reflective facets that provide total internal reflection. According to another example, the lens may utilize reflective facets, with or without refractive facets.

Figure 15:
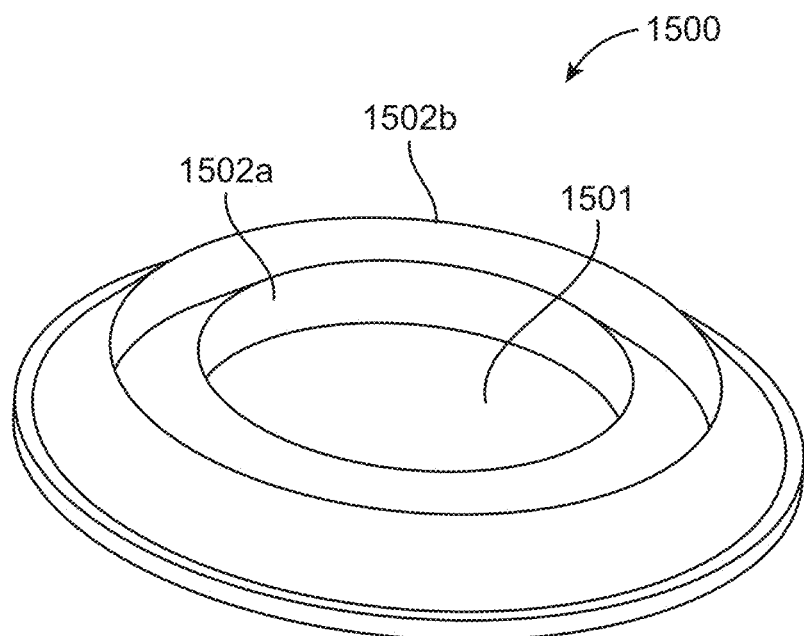
FIG. 15 illustrates a perspective view of an alternative lens with two active facets and an aperture according to one example of the technology.

As discussed above, employing facets enables the design and fabrication of thin and light weight lenses. This concept is demonstrated with reference to FIGS. 14 and 15. FIG. 14 illustrates a lens 1400 having facets 1402a,1402b with a continuously angled surface. FIG. 15 illustrates that a substantially equivalent facet may be constructed from two or more thinner concentric facets having similarly angled refractive surfaces. Specifically, FIG. 15 illustrates a lens 1500 having two concentric facets 1502a,1502b with similarly angled refractive surfaces. According to one example, each concentric facet 1502a,1502b is substantially half the depth or thickness of the corresponding facet 1402a illustrated in FIG. 14. Stated differently, the thickness dimension of the concentric facets 1502a,1502b is substantially equivalent to slicing the facet 1402a in a vertical or depth direction at approximately half the depth of the lens 1400. FIG. 15 illustrates that the concentric facets 1502a,1502b may be nested such that the facet 1502a includes a small sized diameter and the facet 1502b includes larger sized diameter. According to this example, the nesting arrangement allows formation of a lens 1500 having half the depth of lens 1400, with substantially equivalent performance. Since the two concentric facets 1502a,1502b have a substantially equivalent surface area as to facet 1402a, the lens 1500 with concentric facets 1502a,1502b having a reduced thickness, will perform substantially similar to lens 1400 having facet 1402a.

Figure 16:
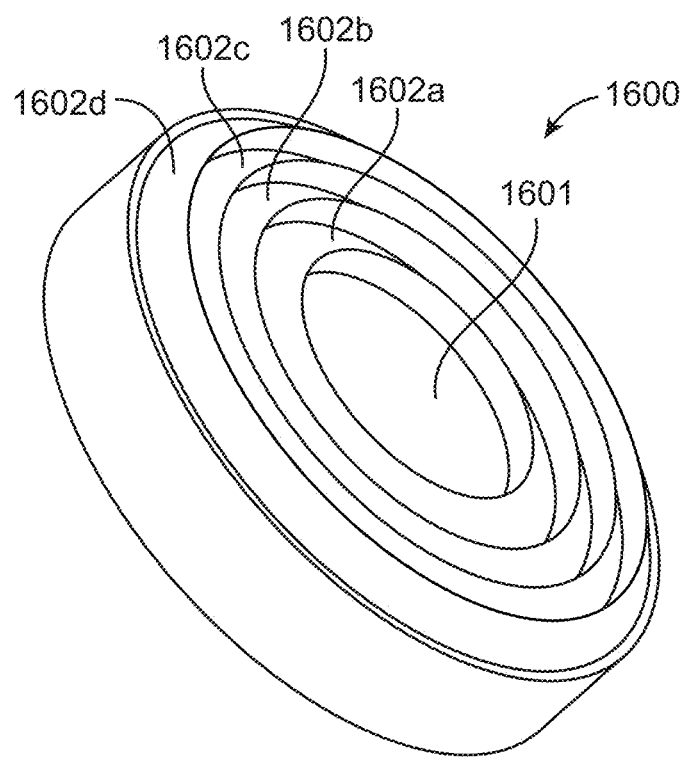
FIG. 16 illustrates a perspective view of a lens with four active facets and an aperture according to one example of the technology.

According to another example, FIG. 16 illustrates a lens 1600 that includes four concentric facets 1602a-1602d with similarly angled refractive surfaces. According to one example, each concentric facet 1602a-1602d includes substantially a quarter the depth of the facet 1402a illustrated in FIG. 14. Stated differently, the thickness dimension of the concentric facets 1602a-1602d is substantially equivalent to slicing the facet 1402a in a vertical or depth direction at approximately a quarter the depth of the lens 1400. FIG. 16 illustrates that the concentric facets 1602a-1602d may be nested such that facet 1602a includes a small sized diameter and facet 1602d includes the largest sized diameter. According to this example, the nesting arrangement enables the lens 1600 to have a quarter the depth of the lens 1400, with substantially equivalent performance. Since the four concentric facets 1602a-1602d have a substantially similar surface area as compared to the facet 1400, the lens 1600 with concentric facets 1602a-1602d, having a reduced thickness, will perform substantially similar to lens 1300 having facet 1302a. According to one example, a thinner lens design enables the fabrication of short, rigid probe tips that may be used with flexible endoscopes or the like.

Figure 17A:
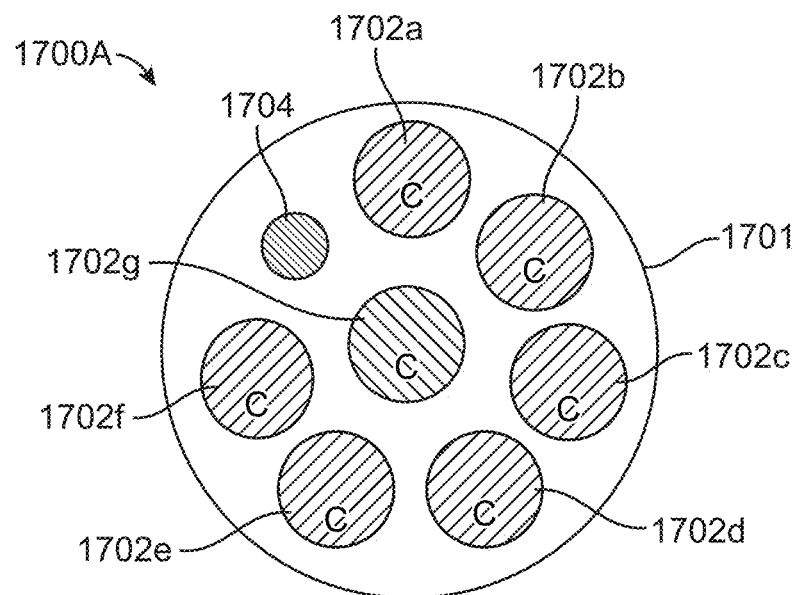
FIG. 17A illustrates a bottom view of a lens structure having multiple lenslets and an alignment pin according to one example of the technology.

FIG. 17A illustrates a bottom view of a lens component 1700A made from a clear optical substrate 1701 having individual lenslets 1702a-1702g with facets. According to one example, the lenslets 1702a-1702g may collimate light rays emitted from individual fibers. According to one example, the lens 1700A may include an array of individual lenslets 1702a-1702f that correspond to individual collection fibers 107 provided thereunder. According to one example, lenslet 1702g may correspond to an emission fiber 110. According to one example, the lenslet 1702g may be omitted, leaving an aperture in its place. According to one example, the lens 1700A may be employed for a fiber optic probe having individual collection fibers 107 arranged around the emission fiber 110. According to one example, the lens 1700A may be employed for a fiber optic probe having two lenses, with one lens corresponding to the emission fiber 110 and a second lens corresponding to a bundle of the collection fibers 107 or a single collection fiber 107. According to one example, a lens shape may be selected to focus an image at a common point. According to one example, the lens 1700A may include an alignment mechanism 1704 that properly orients the individual lenslets 1702a-1702f with corresponding collection fibers 107. For example, the probe may include a fiber alignment holder 113 with an end face 114 having a hole that receives a post 1704 provided at the lens component.

Figure 17B:
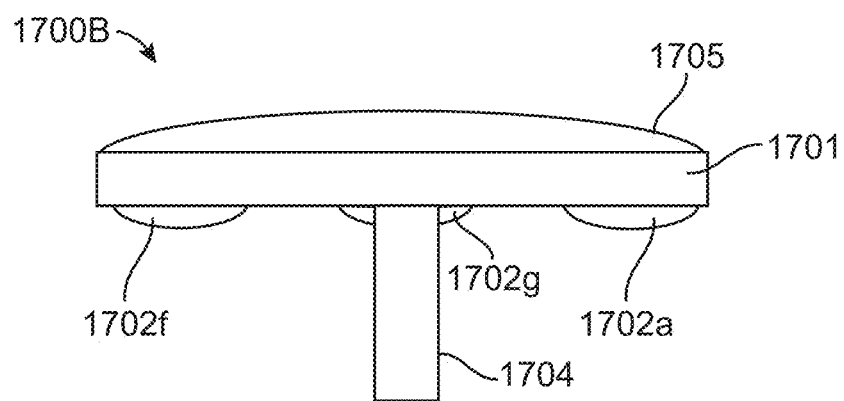
FIG. 17B illustrates a side view of a lens structure having multiple lenslets and an alignment pin according to one example of the technology.

FIG. 17B illustrates a side profile of the lens component 1700 showing the post 1704 protruding therefrom. According to one example, the lens 1700B may include a hemisphere lens 1705 and individual lenslets 1702a-1702g that correspond to individual fibers or bundle of fibers. According to one example, the hemisphere lens 1705 may be common to all lenslets 1702a-1702g. According to one example, the lens 1700B may enable separate lens designs for individual fibers or bundle of fibers. For example, the separate lens designs may enable custom features for each lens such as specific wavelength filters, or the like, for each fiber or bundle of fibers. According to one example, providing custom features for each lens enhances multi-spectroscopy probe performance, Raman spectroscopy with imaging such as coherent fiber bundle or camera, OCT, Fluorescence, diffuse reflectance, or the like. According to one example, the individual lenses 1702a-1702g may include non-faceted features.

Figure 18:
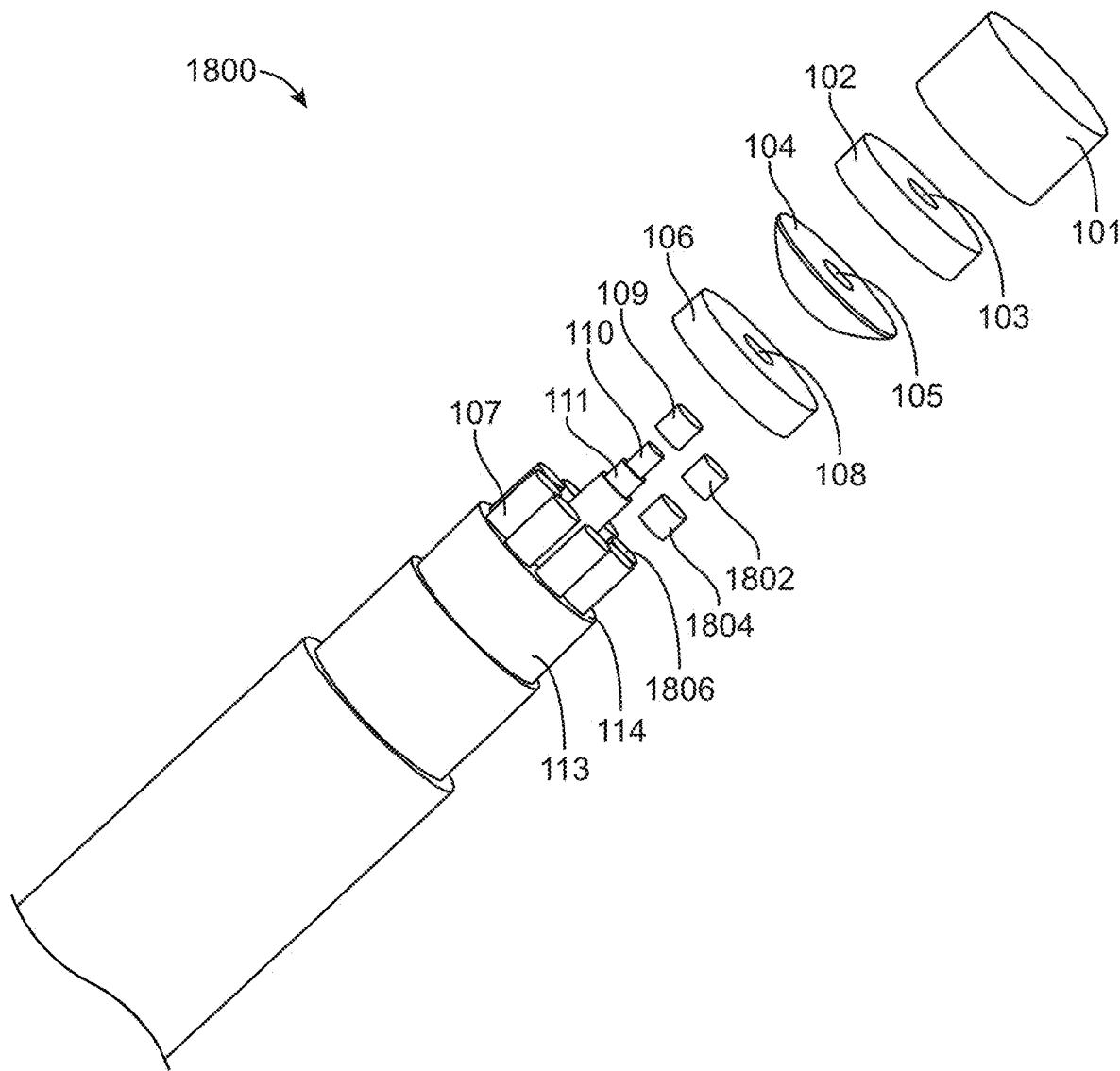
FIG. 18 illustrates an exploded view of a fiber optic probe having a filter forward of the lens, probe components with apertures, and an internal calibration sample according to one example of the technology.

FIG. 18 illustrates an exploded view of a probe tip for a fiber optic probe 1800 having a built-in calibration sample according to one example of the technology. According to one example, the fiber optic probe 1800 may include several components such as a window 101, a lens filter 102 having an aperture 103, a lens 104 with an aperture 105, a collection fiber filter 106 associated with one or more collection fibers 107, the collection fiber filter 106 having an aperture 108, an emission fiber filter 109 associated with one or more emission fibers 110, a calibration sample 1802, a calibration filter 1804, a calibration fiber 1806, and a needle tube 111 that prevents light transfer proximate to the probe tip between the emission fibers 110 and the collection fibers 107. According to one example, a carbon black filled epoxy may be used in place of the needle tube 111. According to one example, the components include a distal end located forward or upstream of the probe and a proximal end located downstream of the probe. According to one example, the distal and proximal ends form component interfaces. According to one example, the distal and proximal ends may be positioned substantially perpendicular to the light path. According to one example, the lens filter 102, the lens 104, and the collection fiber filter 106 may be donut-shaped components. According to one example, the emission fiber filter 109 and the emission fiber 110 may be inserted into or may pass through corresponding apertures in the donut-shaped components when the fiber optic probe 1800 is assembled.

According to one example, the fiber optic probe 1800 includes several collection fibers 107 such that one or more collection fibers may be reserved as a calibration fibers 1806. According to one example, a calibration filter 1804 may be placed in between the calibration fiber 1806 and a calibration sample 1802. According to one example, the calibration sample 1802 may include Tylenol®, NIST glass, or the like.

Prior to this technology, probe or spectrometer calibration was performed using an external calibration sample or an external calibration light source. External calibration has drawbacks in medical applications that require sterile environments. According to one example, the fiber optic probe 1800 eliminates drawbacks associated with performing calibration external of the probe tip. According to one example, the calibration fiber 1806 may be configured to originate a calibration light internal to the probe tip. According to one example, performing internal calibration simplifies, expedites, and eliminates sources of non-uniformity as compared to performing external calibration of samples or sources. Furthermore, an internal calibration source may be safely employed in medical settings that require a sterile environment. According to one example, the internal calibration fiber 1806 offers a sealed or sterilized calibration source that is required in medical settings. According to one example, the calibration sample 1802 may be cut or shaped for placement at a fiber distal end.

According to one example, the fiber optic probe 1800 may employ the calibration fibers 1806 to deliver laser light used for Raman excitation. According to one example, the calibration laser light may be obtained from a laser splitter and may impinge or interact with an internal calibration sample 1802. According to one example, employing the laser splitter allows a same laser light source to be used both for measurement and calibration. According to one example, a reflective material such as an aluminum mirror may be placed proximate to the probe tip to increase an intensity of the calibration spectra.

Figure 19:
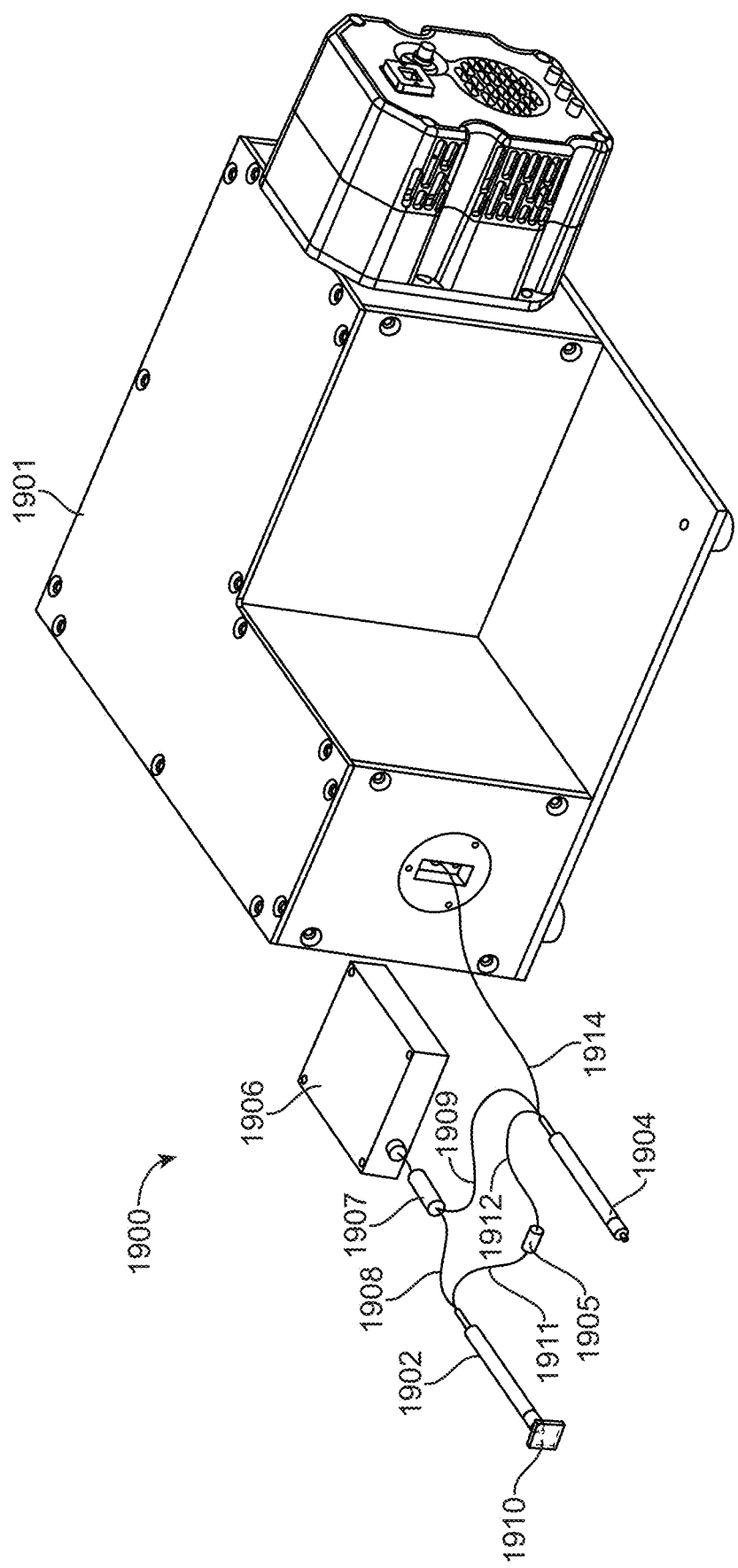
FIG. 19 illustrates an external calibration system according to one example of the technology.

FIG. 19 illustrates an alternative calibration system 1900 that includes a spectrometer 1901 optically coupled to a calibration module 1902 and a fiber optic probe 1904 according to one example of the technology. The fiber optic probe 1904 may include, for example, the fiber optic probes described herein. According to one example, a coupler 1905 may be provided to optically couple the calibration module 1902 and the fiber optic probe 1904. According to one example, an excitation laser source 1906 generates an excitation laser light that is directed to a splitter or diverter 1907. According to one example, the splitter 1907 may split the excitation laser light according to a 50/50 ratio, a 60/40 ratio, or the like. According to one example, the splitter 1907 may be optically coupled to a calibration emission fiber 1908 associated with the calibration module 1902 and a probe emission fiber 1909 associated with the fiber optic probe 1904. According to one example, the excitation laser light may impinge upon the calibration sample 1910 causing it to emit a calibration signal that is captured by a calibration collection fiber 1911 and provided to a probe collection fiber 1912 through the coupler 1905. According to one example, the calibration system 1900 may include multiple calibration samples and may be configured to select among the plurality of calibration samples. According to one example, the calibration system 1900 may include a rotary wheel that rotates to provide a desired calibration sample. Alternatively, the calibration system 1900 may include additional calibration modules assigned to additional calibration samples. In this case, the calibration system 1900 may include additional splitters 1907 and couplers 1905 to support the additional calibration modules.

According to one example, the probe collection fiber 1912 may direct the calibration signal into the fiber optic probe 1904 where the remaining probe collection fibers 1914 receive the calibration signal and direct it into the spectrometer 1901. According to one example, the calibration system 1900 provides a calibration signal that is employed in medical settings. Employing a separate calibration module 1902 offers an advantage that the calibration sample 1910 may be changed to a different calibration sample if needed. A further advantage of using a separate calibration module 1902 may be that the calibration sample 1910 is not required to be built into a fiber optic probe itself.

According to another example, a calibrated white light source or an atomic line source may be injected into a proximal end of the calibration fiber 1806 for the fiber optic probe 1800 or the probe injection fiber 1912 for the fiber optic probe 1904. According to one example, a known response of the white light or the atomic line source may be used for calibration purposes.

Figure 20:
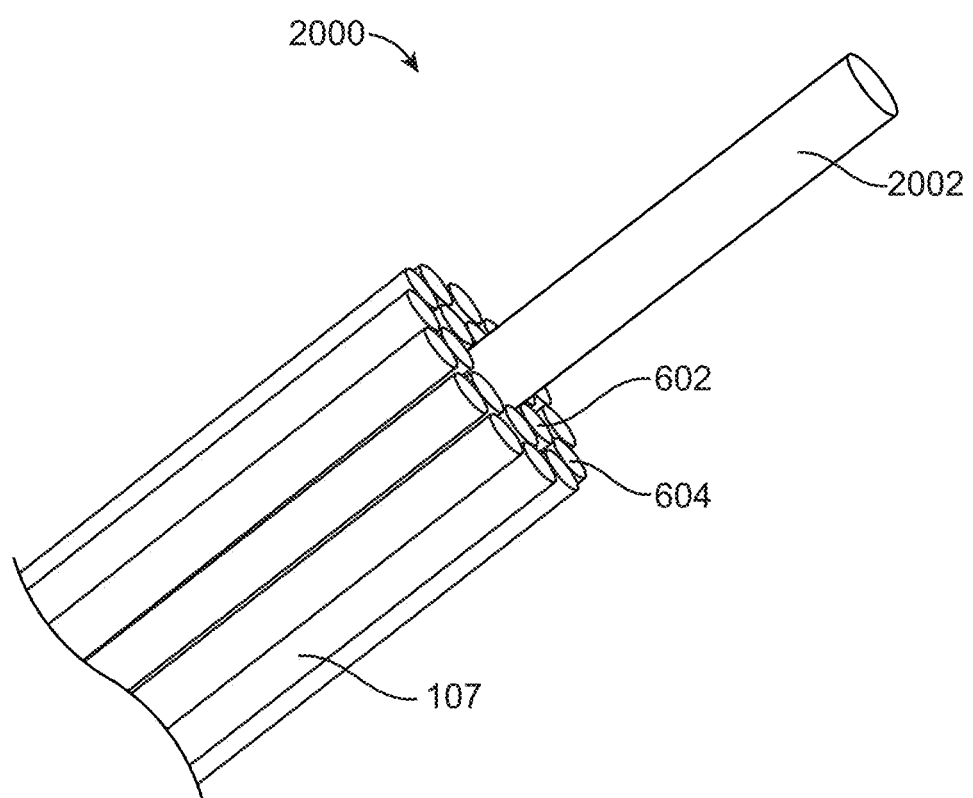
FIG. 20 illustrates construction of a two-ring concentric configuration of collection fibers according to one example of the technology.

The technology provides a method for constructing a smallest diameter concentric multi-ring fiber optic bundle with the largest number of collection optical fibers. FIG. 20 illustrates one example of a concentric, two (2) ring 602,604 fiber optic bundle that provides the largest number of collection optical fibers. In a first operation, a first or inner ring 602 may include several 300-micron core optical fibers 107 placed around a 0.021" outer diameter (OD) polytetrafluoroethylene (PTFE) Teflon-coated pin or wire 2002. In a second operation, heat shrink tubing may be employed to securely hold the first ring 602 of optical fibers 107 tightly against the outer diameter of the pin 2002. In a third operation, the optical fibers 107 may be secured together using a thin epoxy that fixedly holds the first ring 602 of optical fibers in position when cured. In a fourth operation, after the epoxy is cured, the heat shrink may be removed and the second ring 604 of 300-micron core fibers 107 may be placed around the inner ring 602 of fibers. In a fifth operation, a heat shrink tubing may be employed to securely hold the optical fibers 107 tightly against the first ring 602 of optical fibers 107. In a sixth operation, the optical fibers 107 may be secured together using a thin epoxy that fixedly holds the second ring 604 of optical fibers 107 in position when cured. In a seventh operation, the PTFE pin 2002 is removed from the first and second rings 602,604 of optical fibers 107. The removed PTFE pin 2002 leaves behind an aperture or hole that receives an emission optical fiber 110 therethrough. In an eighth operation, the optical fibers 107 that form the first and second rings 602,604 may be polished to an optical quality finish. In a separate operation, the emission fiber 110 may be polished and inserted into the hole at the center bundle of first and second rings 602,604. In another operation, the fiber collection filter 106 may be placed on the first and second rings 602,604 of polished optical fibers 107 and secured with clear optical epoxy.

It is to be understood that while a certain form of the technology is illustrated, it is not to be limited to the specific form or arrangement herein described and illustrated. It will be apparent to those skilled in the art that various changes may be made without departing from the scope of the invention and the invention is not to be considered limited to what is shown and described in the specification and any drawings or figures included herein.

According to one example, the descriptions provided herein may be used for any optical probe. Additionally, while the examples provided herein are directed to the medical field, one of ordinary skill in the art will readily appreciate that this technology may be used with any fields or applications that employ chemical analysis. Examples are described above with the aid of functional building blocks that illustrate the implementation of specified operations and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A fiber optic probe having a distal sampling end, a proximal end, a light delivery path therethrough, and a light collection path therethrough, the fiber optic probe comprising:
    a window disposed at the distal end of a lens collection filter, the window having a distal end and a proximal end;
    a lens disposed near the proximal end of the window, the lens having a distal end and a proximal end;
    an alignment feature provided between the distal and proximal ends of the lens, the alignment feature being affixed to the lens and having an aperture;
    a light delivery optical fiber having a distal end and a proximal end, the distal end passing through the aperture defined in the alignment feature; and
    a collection optical fiber in optical communication with the lens and window.

2. The fiber optic probe according to claim 1, wherein the lens collection filter is disposed between the window and the lens, the lens collection filter having a distal end and a proximal end.

3. The fiber optic probe according to claim 1, wherein the lens is at least one of refractive, reflective, or totally internally reflective.

4. The fiber optic probe according to claim 1, further comprising a fiber collection filter disposed between the lens and the collection optical fiber, the fiber collection filter having a distal end and a proximal end.

5. The fiber optic probe according to claim 1, wherein the collection optical fiber is provided in a multi-ring arrangement.

6. The fiber optic probe according to claim 5, wherein the multi-ring arrangement includes an inner ring and an outer ring, wherein the inner ring corresponds to a first depth measurement and the outer ring corresponds to second depth measurement, the first depth measurement being greater than the second depth measurement.

7. The fiber optic probe according to claim 1, further comprising a core tube that is friction fitted into the alignment feature aperture.

8. The fiber optic probe according to claim 1, wherein the light delivery optical fiber emits laser light at or forward of the distal end of the lens.

9. The fiber optic probe according to claim 1, further comprising an emission filter disposed at a distal end of the light delivery optical fiber.

* * * * *